United States Patent
Gould et al.

(10) Patent No.: US 11,880,696 B2
(45) Date of Patent: *Jan. 23, 2024

(54) HIERARCHICAL DATA BINDING FOR INDUSTRIAL CONTROL SYSTEMS

(71) Applicant: Inductive Automation, LLC, Folsom, CA (US)

(72) Inventors: Carl Reuben Gould, Folsom, CA (US); Perry Linn Arellano-Jones, Sacramento, CA (US)

(73) Assignee: INDUCTIVE AUTOMATION, LLC, Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,831

(22) Filed: Feb. 6, 2023

(65) Prior Publication Data
US 2023/0176879 A1  Jun. 8, 2023

Related U.S. Application Data

(63) Continuation of application No. 17/892,132, filed on Aug. 22, 2022, now Pat. No. 11,609,771, which is a
(Continued)

(51) Int. Cl.
*G06F 3/0484* (2022.01)
*G06F 9/451* (2018.01)
(Continued)

(52) U.S. Cl.
CPC .............. *G06F 9/451* (2018.02); *G05B 19/05* (2013.01); *G05B 19/41845* (2013.01);
(Continued)

(58) Field of Classification Search
CPC ...... G06F 9/451; G06F 3/04847; G06F 40/14; G06F 40/197; G05B 19/41845; G05B 2219/23258; G05B 2219/23327
See application file for complete search history.

(56) References Cited

U.S. PATENT DOCUMENTS 8,407,661 B2   3/2013  Wang et al.
8,898,204 B1  11/2014  Sathe et al.
(Continued)

FOREIGN PATENT DOCUMENTS

EP  2237149 A1 *  1/2010  ............... G06F 9/44
EP  2237149 A1    10/2010

OTHER PUBLICATIONS

United States Office Action, U.S. Appl. No. 16/134,825, dated Nov. 14, 2018, 16 pages.
(Continued)

*Primary Examiner* — Phenuel S Salomon
(74) *Attorney, Agent, or Firm* — Fenwick & West LLP

(57) ABSTRACT

A system provides a design interface for designing and implementing graphical user interfaces that users can access through web browsers. Depending on the configuration of the graphical user interfaces, the users may be able to monitor and control industrial processes by interacting with components that correspond to the industrial processes as displayed in user interfaces at client devices. The design interface includes functionality for selecting preprogrammed components, or for generating new components for display. The design interface further allows designers to associate data values received from a variety of sources with properties of the components in the user interfaces. In particular, properties associated with a component of an interface are stored in property tree structures, making dynamic changes to the components possible. Data bindings between subtrees representing components and sets of data from industrial and other sources allows for designs that scale with the availability of the data.

20 Claims, 22 Drawing Sheets

Related U.S. Application Data continuation of application No. 16/781,792, filed on Feb. 4, 2020, now Pat. No. 11,455,177, which is a continuation of application No. 16/134,823, filed on Sep. 18, 2018, now Pat. No. 10,592,260.

(60) Provisional application No. 62/561,560, filed on Sep. 21, 2017.

(51) Int. Cl.

| | |
|---|---|
| *G05B 19/05* | (2006.01) |
| *G06F 3/04847* | (2022.01) |
| *G06F 3/04842* | (2022.01) |
| *G06F 8/34* | (2018.01) |
| *G06F 16/95* | (2019.01) |
| *G06F 8/36* | (2018.01) |
| *G06F 8/38* | (2018.01) |
| *G06F 40/197* | (2020.01) |
| *G06F 40/14* | (2020.01) |
| *G05B 19/418* | (2006.01) |
| *G06F 9/455* | (2018.01) |

(52) U.S. Cl.
CPC ........ *G06F 3/0484* (2013.01); *G06F 3/04842* (2013.01); *G06F 3/04847* (2013.01); *G06F 8/34* (2013.01); *G06F 8/36* (2013.01); *G06F 8/38* (2013.01); *G06F 16/95* (2019.01); *G06F 40/14* (2020.01); *G06F 40/197* (2020.01); *G05B 2219/13144* (2013.01); *G05B 2219/23258* (2013.01); *G05B 2219/23327* (2013.01); *G06F 9/45529* (2013.01)

(56) References Cited

U.S. PATENT DOCUMENTS

| | | | |
|---|---|---|---|
| 2004/0021679 | A1 | 2/2004 | Chapman et al. |
| 2005/0066287 | A1* | 3/2005 | Tattrie ............... G06F 8/34 |
| | | | 715/769 |
| 2007/0130572 | A1 | 6/2007 | Gilbert et al. |
| 2007/0260982 | A1 | 11/2007 | Wayland et al. |
| 2007/0276689 | A1* | 11/2007 | Slone ............... G06F 3/04817 |
| | | | 717/109 |
| 2008/0320385 | A1 | 12/2008 | Freiman et al. |
| 2009/0210814 | A1* | 8/2009 | Agrusa ............... G06F 11/324 |
| | | | 700/83 |
| 2011/0046754 | A1 | 2/2011 | Bromley et al. |
| 2011/0145298 | A1* | 6/2011 | Himmelsbach ....... G06F 16/258 |
| | | | 707/802 |
| 2012/0233182 | A1* | 9/2012 | Baudel ............... G06F 16/22 |
| | | | 707/748 |
| 2013/0006395 | A1* | 1/2013 | Plache ............... G06F 3/04842 |
| | | | 700/83 |
| 2014/0143369 | A1 | 5/2014 | Dobre |
| 2016/0004399 | A1 | 1/2016 | Hewitt et al. |
| 2018/0284715 | A1 | 10/2018 | Saunders et al. |
| 2018/0307193 | A1* | 10/2018 | Roth ............... G05B 19/05 |

OTHER PUBLICATIONS

United States Office Action, U.S. Appl. No. 16/134,823, dated Jul. 8, 2019, 20 pages.
United States Office Action, U.S. Appl. No. 16/134,823, dated Nov. 14, 2018, 28 pages.
United States Office Action, U.S. Appl. No. 16/781,792, dated Nov. 12, 2021, 15 pages.
United States Office Action, U.S. Appl. No. 16/781,792, dated Apr. 27, 2021, 28 pages.
United States Office Action, U.S. Appl. No. 16/781,792, dated Oct. 5, 2020, 10 pages.

* cited by examiner

800

---

Displaying a component in a live web browser of a component display portion of a GUI
805

↓

Receiving, at the component display portion, a selection input of selecting the component
810

↓

In response to receiving the selection input, displaying a component data model in a property editor portion
820

↓

Receiving, at the property editor portion, an edit input of editing the component data model
830

↓

In response to receiving the edit input, updating the component data model in the property editor portion according to the edit input
840

↓

Updating the component in the web browser of the component display portion based on the edit input
850

```
┌─────────────────────────────────────────────────────────────────┐
│ Receiving an edit input corresponding to establishing a data    │
│ binding between a subtree of a component data model to a        │
│ source data model                                                │
│ 910                                                              │
└─────────────────────────────────────────────────────────────────┘
                                 ↓
┌─────────────────────────────────────────────────────────────────┐
│ In response to receiving the edit input, displaying a binding   │
│ editor portion of the GUI that displays a set of source data    │
│ models including at least a first source data model             │
│ 920                                                              │
└─────────────────────────────────────────────────────────────────┘
                                 ↓
┌─────────────────────────────────────────────────────────────────┐
│ Receiving, at the binding editor portion, a binding input of    │
│ binding the subtree of the component data model to the first    │
│ source data model                                                │
│ 930                                                              │
└─────────────────────────────────────────────────────────────────┘
                                 ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Receiving, at the binding editor portion, an input for adding    │
│ one or more transforms to the data binding                       │
│ 940                                                              │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Displaying, at the binding editor portion, a preview of the      │
│ transformed set of data values according to the added transforms │
│ 950                                                              │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 ↓
┌─────────────────────────────────────────────────────────────────┐
│ Updating the component data model in the property editor        │
│ portion according to the binding input                           │
│ 960                                                              │
└─────────────────────────────────────────────────────────────────┘
                                 ↓
┌─────────────────────────────────────────────────────────────────┐
│ Updating the component in the web browser of the component      │
│ display portion based on the binding input                       │
│ 970                                                              │
└─────────────────────────────────────────────────────────────────┘
```

FIG. 9

HIERARCHICAL DATA BINDING FOR INDUSTRIAL CONTROL SYSTEMS

CROSS-REFERENCE TO RELATED APPLICATIONS

This application is a continuation of U.S. application Ser. No. 17/892,132, filed Aug. 22, 2022, now U.S. Pat. No. 11,609,771, which is a continuation of U.S. application Ser. No. 16/781,792, filed Feb. 4, 2020, now U.S. Pat. No. 11,455,177, which is a continuation of U.S. application Ser. No. 16/134,823, filed Sep. 18, 2018, now U.S. Pat. No. 10,592,260 which claims the benefit of U.S. Provisional Application No. 62/561,560, filed Sep. 21, 2017, all of which are incorporated herein by reference in their entirety.

BACKGROUND

Field of Art

This disclosure relates generally to generating user interfaces, specifically graphical user interfaces (GUIs), for web-based applications, and in particular to generating GUIs related to monitoring and controlling industrial processes using data bindings to hierarchical structures of data values.

Description of Art

Industrial processes can produce a great deal of useful and important data related to the states and conditions of associated machines and other data production sources. For example, it is advantageous for a manager of a factory to be able to monitor the state of a pump, oven, or pipeline remotely without the need to inspect the entity in person. Real-time remote monitoring of industrial processes becomes especially important at scale. For example, it is infeasible for a manager in charge of multiple factories, each having hundreds of motors to inspect every motor in person.

Software that allows users to view information about different components related to an industrial process can thus be useful. However, it can be likewise time consuming and occasionally infeasible for designers of user interfaces to configure the interfaces such that they can show useful, relevant, and current information if the designers need to develop applications from scratch that represent the particular components of any one industrial process, especially when the same designers need to hard code (as well as update) information about individual machines. This problem is exacerbated when a designer needs to understand software development to be able to make a user interface.

SUMMARY

A system provides an interface for designing and implementing graphical user interfaces that users can access through web browsers. Depending on the configuration of the user interfaces, the users may be able to monitor and control many components of industrial processes from clients such as computer devices like smartphones, tablets, desktop computers, laptop computer, and the like. The design interface includes functionality for selecting preprogrammed components, or for generating new components for display. The design interface further makes it possible for designers to associate data values received from a variety of sources with properties of the components in the user interfaces. In particular, properties associated with a component of an interface are stored in property tree structures, making dynamic changes to the components possible. Data bindings between subtrees representing components and sets of data from industrial and other sources allows for designs that scale with the availability of the data.

In one embodiment, a method comprises steps of: establishing a data binding between a first source data model and a subtree of a first property tree, the first data source model associated with a first source selected from a plurality of sources and comprising data values from the first source structured in a source hierarchy, the subtree of the first property tree comprising a set of nodes with associated component properties configured in component hierarchy that matches the structure of the source hierarchy of the first source data model; receiving an updated configuration corresponding to a change in the first source data model such that the first source data model is structured in an updated source hierarchy; in response to receiving the updated configuration: identifying the subtree of the first property tree associated with the first source data model based on the established data binding; and updating the structure of the subtree of the first property tree to match the updated source hierarchy of the first source data model.

In another embodiment, a method of presenting and editing properties of components for web-based applications of industrial processes, the method comprises steps of: receiving, at a component display portion of a graphical user interface (GUI) comprising a live web browser, a selection input of selecting a component, the component associated with a first component template selected for the component display portion from a set of component templates in a component template library; in response to receiving the selection input, displaying a component data model in a property editor portion of the GUI, the component data model comprising a set of component properties structured in a component hierarchy; receiving, at the property editor portion, an edit input of editing one or more component properties in the set of component properties; and in response to receiving the edit input, updating the component data model in the property editor portion according to the edit input.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 8 is a flowchart illustrating a process of editing a component data model with a design GUI, in accordance with one or more embodiments.

FIG. 9 is a flowchart illustrating a process of establishing a data binding for a component property with a design GUI, in accordance with one or more embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
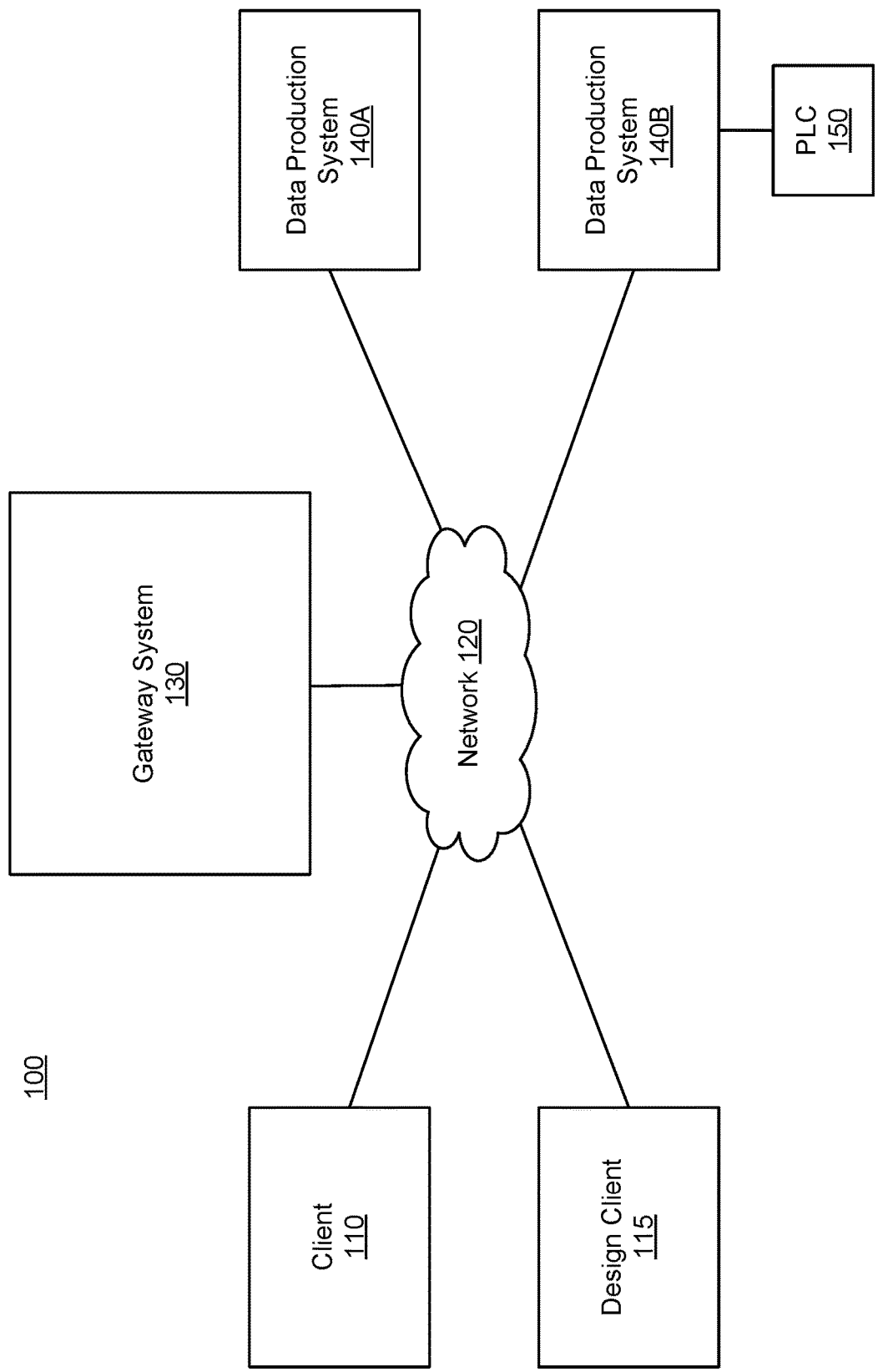
FIG. 1 is a high-level block diagram of a system environment for a gateway system, in accordance with an embodiment.

FIG. 1 is a high-level block diagram of a system environment 100 for a gateway system 130, in accordance with an embodiment. The system environment 100 shown in FIG. 1 includes the gateway system 130, a client 110, a design client 115, a network 120, a data production system 140A, a data production system 140B, and a programmable logic controller (PLC) 150. For clarity, only one client 110, one design client 115, and two data production systems 140 (i.e., 140A and 140B) are shown in FIG. 1. Alternate embodiments of the system environment 100 can have any number of clients 110 and design clients 115, as well as more or fewer data production systems 140. As one example of an alternate embodiment, a client 110, design client 115, and gateway system 130 may all be a part of one machine without interacting over a network 120. The functions performed by the various entities of FIG. 1 may also vary in different embodiments.

The gateway system 130 coordinates the synchronization and display of data on clients 110. That is, the gateway system 130 acts as a backend to support information displayed to users at the client 110 which represents a frontend. The gateway system 130 stores and provides information about user interfaces for applications such as web applications. The web applications may, for example, be web applications for monitoring and interacting with local or remote industrial systems and processes.

User interfaces for the applications may be generated by a designer through a design client 115 and may include views of components. User interfaces may include graphical user interfaces that use one or more graphical elements for interfacing with one or more users. The gateway system 130 stores information about such interfaces for display at clients 110 and manages and routes underlying data that may cause changes to the display of the interface at a client 110. A component is a graphical element in a view and information about the component is stored in the gateway system 130 as a "component data model." Some examples of components include user interaction components, such as sliders, buttons, text fields, and drop down menus; this list is non-exhaustive. Examples of components may further include visual representations of machines or data related to industrial processes such as visual representations of pumps, gauges, dials, levers, motors, conveyor belts, tanks, ovens, graphs, and so forth.

The gateway system 130 acts as an intermediary between the actual industrial processes and information about such processes that is displayed at a client 110. In particular, the gateway system 130 makes it possible to establish uni-directional and bi-directional data bindings such that data coming from a data source, such as a data production system 140 is reflected in information displayed at a client 110. If bi-directional, adjustments made to the industrial process through a component of a GUI at a client 110 also can make changes to the industrial process occurring at the data production system 140.

A user may view and interact with a GUI through a client 110. Clients 110 can be personal or mobile computing devices such as smartphones, tablets, or notebook computers, desktop computers, or other forms of computing devices. In some embodiments, the client 110 accesses GUIs provided by the gateway system 130 via a browser application running on the client 110 that accesses information on the gateway system 130 over the network 120. In some embodiments, the client 110 executes a client application that uses an application programming interface (API) to access GUIs provided by the gateway system 130 through the network 120.

As one example, a user may access a GUI for an industrial process by navigating to the GUI using a browser to interact with the gateway system 130. For example, a manager at an industrial bakery may want to know the temperature of a set of ovens in the bakery. The manager could access a GUI designed to display components representing the ovens and their current temperatures by navigating to the GUI, hosted by the gateway system 130, which is associated with oven temperatures via a browser on the client 110.

The design client 115 is a type of client 110 that is configured to allow a user to design the GUIs that may be accessed via other clients 110. In one embodiment, all clients may also be design clients 115, and design clients 115 may allow a user to do everything a user can do via a client 110, such as viewing and interacting with the GUI. The design client 115 may display a design GUI provided by the gateway system 130 that allows a designer to organize and configure components of a GUI for representing a system, industrial process, or the like. In addition to allowing a designer to define a layout of components for a GUI, the design GUI may include functionality for a designer to establish data bindings between data values originating from various data sources at a data production system 140 and component properties associated with a component in the GUI. For example, a GUI for monitoring oven temperatures in an industrial bakery may include components representing temperature gauges for each oven, configured such that a change in an oven's temperature affects the display of the gauge in the GUI, when viewed at a client. A designer may also use the design GUI to assign values to visual aspects of the components in the GUI, for example, by including labels, designating colors, and the like.

A data production system 140 may be any system that acts as a data source for the gateway system 130. That is, a data production system 140 provides data values to the gateway system 130. Examples of data production systems 140 include open platform communications (OPC) servers, programmable logic controllers (PLCs), web servers supporting representational state transform application programming interfaces (RESTful APIs), databases, or other systems that can provide data values. In some cases, the gateway system 130 may act as a data production system 140 with respect to itself, for example, when a component property is defined in association with properties of another component. In some embodiments, the gateway system 130 may act as a data production system 140 when hosting user-defined data values (sometimes also referred to as "user defined tags"). For example, a designer may store a data value or information for generating a data value (e.g., a script) at the gateway system 130. A GUI displayed at a client 110 may incorporate information received from various combinations of different data production systems 140.

In the example of FIG. 1, data production system 140B may be an example of an OPC server providing an interface between the gateway system 130 and data values produced by a PLC 150. In some embodiments, a PLC 150 stores values referred to as "PLC tags" in a tag database within the memory of the PLC 150. A PLC tag is generally a named variable that can be assigned a type of data and stored in the memory of a PLC 150. Throughout this document, the term "PLC tag" may also be used to refer to the data values output from a PLC 150, which may be received by the gateway system 130 in the form of named variables, or as unnamed data values. In one embodiment, the gateway system 130 represents data values (e.g., including PLC tag values received from PLCs) as data values, as may be stored in a source data store 240 on the gateway system 130.

As an example, the PLC 150 may be coupled to an oven for monitoring and control of oven parameters. The PLC tag values generated by the PLC 150 may be tuples of data values including a scalar value, a quality value, and a timestamp value. For example, a PLC 150 may be coupled to an oven in an industrial bakery, and may be configured to monitor and control the oven temperature and the oven humidity. The PLC 150 may provide data related to the oven temperature and the oven humidity to the gateway system 130 via the data production system 140B. In one example the tuple of data values may include a scalar value for the temperature of the oven, a quality value of the scalar value retrieved from the PLC 150, and a timestamp value corresponding to the determined scalar value. Changes to the oven temperature and humidity may be displayed via the GUI at clients 110 and at the design client 115. In some embodiments, the data production system 140 can also receive data from the gateway system 130 and update associated systems and processes accordingly. For example, a manager at the industrial bakery may adjust target values for the temperature of an oven via components of the GUI at a client 110. The changed value related to oven temperature may be sent by the gateway system 130 to the data production system 140, which can adjust the actual temperature of the oven via the PLC 150.

Clients 110, design clients 115, and data production systems 140 can communicate with the gateway system 130 via the network 120, which may comprise any combination of local area and wide area networks employing wired or wireless communication links. In some embodiments, all or some of the communication on the network 120 may be encrypted.

Figure 2:
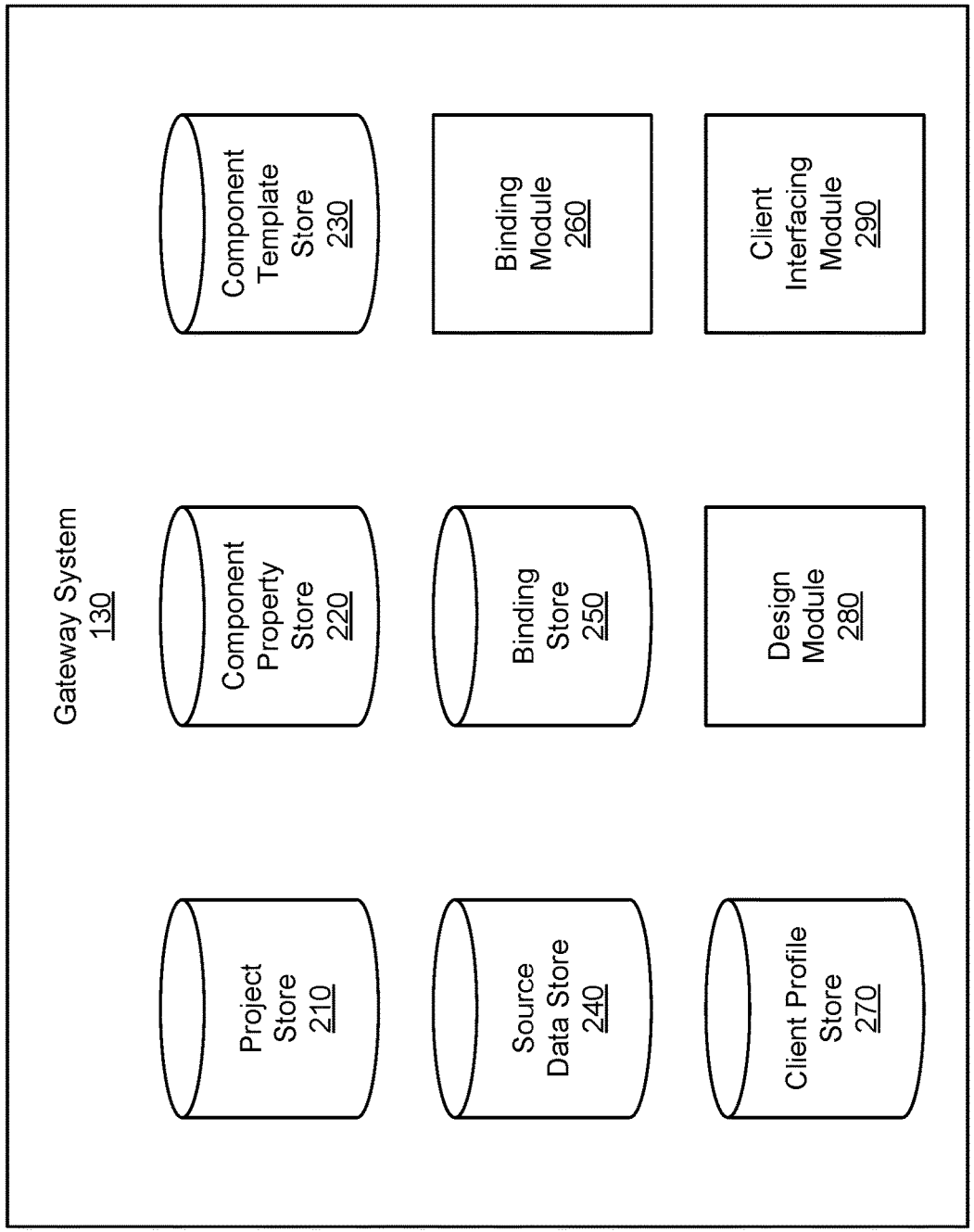
FIG. 2 is a high-level block diagram of a gateway system architecture, in accordance with an embodiment.

FIG. 2 is a high-level block diagram of a gateway system architecture, in accordance with an embodiment. In one embodiment, the gateway system 130 includes a project store 210, a component property store 220, a component template store 230, a source data store 240, a binding store 250, a binding module 260, a client profile store 270, a design module 280, and a client interfacing module 290. In other embodiments, the gateway system 130 may include additional, fewer, and/or different modules from those listed herein. Conventional modules such as web servers, network interfaces, security functions, load balancers, failover servers, management and network operations consoles, and the like are not shown so as to not obscure the details of the system architecture. Additionally, the gateway system 130 may include more, fewer, or different modules and data stores than those shown in FIG. 2, and the functions can be distributed among the modules and data stores in a different manner than is shown in FIG. 2.

The component property store 220 stores information about components (i.e., "component properties") that can be included in a GUI. In particular, the component property store 220 stores property trees that define the properties of the components. A property tree is a data structure comprising a collection of nodes, wherein each node defines some property related to the component. In one embodiment, each node includes a value, a quality, a timestamp value, and a configuration. The multiple values associated with a node are sometimes referred to in this document as a "data value," where a data value is understood to be a tuple of multiple values associated with a node. The quality component is an encoded value that describes the reliability or error state associated with the value. Various quality values may be assigned to various error states defined within the gateway system 130. For example, one quality value corresponds to values that are good, a few quality values correspond to a status of a data source (e.g., PLC 150), and another few quality values correspond to statuses regarding execution of other operations while retrieving the values. The timestamp value records a time and date indicative of when the value was derived. The configuration of a node includes information about data bindings and script handlers that may be associated with the node. The value itself may be a number, a string, a null type, a Boolean, a dataset (i.e., a table-like structure of an ordered collection of rows and columns of information), an array forming an ordered sequence of other nodes in the property tree, or an unordered collection of other nodes.

By virtue of nodes whose values can be an array of other nodes or an unordered sequence of other nodes, a single node is able to encapsulate an arbitrarily structured, deeply nested collection of information, i.e., a tree data structure. These "property trees" are used to define the properties of the components in the GUI.

The component property store 220 stores a component data model for each GUI component. A component data model comprises nodes that represent component properties structured into property trees, the structure of which trees is sometimes referred to herein as a "component hierarchy." Since component properties are represented by nodes in property trees, a component property may be associated with a data value or with a subtree of the component hierarchy comprising additional nodes. In one embodiment, each component property may additionally be assigned a name that identifies the component property.

The project store 210 stores projects that are executable by the gateway system 130. Each project is a human-machine interface (HMI) executed by the gateway system 130 that provides GUIs to one or more clients 110 or 115 for monitoring or controlling systems, such as industrial processes and for interfacing with one or more data production systems 140, such as machines in an industrial system. The project is created and defined by one or more design clients 115 via the design module 280. The one or more design clients 115 communicate with the gateway system 130 to generate and modify the project. Each project presents graphical information via a GUI executed on a client 110. Each project can have project properties that include additional information on that project, e.g., a name of the project, a sub-title, a project description, a date and/or time stamp of project creation or last modification, etc. The project store 210 may store all projects and can provide information about each project to other modules of the gateway system 130.

Each project has one or more views with each view containing information or data presentable to one or more clients 110 via a GUI. Views are graphical portions of the GUI that can display graphical information. Each view contains one or more components. Components are the graphical elements displayed in the view when a project is executed on a client 110, e.g., via a web browser or via an API. Each view has view properties that dictate presentation of the view in the GUI. In some embodiments, each view has view properties that may be categorized into general view properties, parameter view properties, and custom view properties. General view properties may be properties that are present amongst all views and can be toggled to adjust display of the view (e.g., width of the view in the GUI, length of the view, background color of the view, foreground color of the view, name of the view, sub-title of the view, font, etc.). Parameter view properties include parameters that transfer data to and/or from the project to the view. In some embodiments, an input view parameter property receives data external to the page and an output parameter view property transmits data out of the page to the project. In other embodiments, a parameter view property may combine functionality of the input parameter view property and the output parameter view property. Custom view properties may be user-defined and specific to each view.

In some embodiments, pages and containers are used to organize the views within each project. In some embodiments, a page collates one or more views and has associated page properties similar to the view properties defined above for views—such as the general page properties, parameter page properties, and custom page properties. In these embodiments, a page is presented in the GUI such that the one or more views are displayed to be contained within the page. In further embodiments, a container further subdivides a view and may have its own components and its own various container properties similar to the view properties defined above for views.

Components are graphical elements that are placed and configured within a view of a project to be displayed in the GUI when the project is executed by a client 110. As a graphical element, each component has a shape that is defined by one or more features presented in the GUI. The features of components are graphical aspects of the components and are defined by component properties and data values associated with each component property. For example, one feature of a component may be a shape, e.g., sliders, buttons, text fields, and drop down menus. Some components may provide visual representations of machines in industrial processes such as visual representations of pumps, gauges, dials, levers, motors, conveyor belts, tanks, ovens, etc. For example, a component may be a visual representation of a temperature scale. In another example, the component may present a slider that is oriented horizontally. For example, component representing an oven might be a visual representation of an oven and may have component properties such as label, location within the view, color, size, oven temperature, oven humidity, and so forth. In some embodiments, some component properties may store information that does not necessarily influence display of the component in the GUI, but may store additional information about the component or about a data source that may be associated with the component. For example, a designer may choose not to display oven humidity, even though humidity is a component property stored as a data value associated with the oven component.

Component properties may be categorized into general component properties, positional component properties, metadata component properties, and custom component properties. The general component properties may be similar to general view properties described above for the views which are general properties that are present when a component is initially placed into a view—in other words, general component properties are a standard set of component properties that accompany each initial placement of a component in a view. The positional properties describe a relationship of the component to other items (e.g., components, containers, views, and/or pages). The positional component properties may further describe a display position of the component within a displayed view in the GUI. For example, the view may be 300 pixels by 300 pixels and the component may be 50 pixels by 50 pixels centered at the coordinate of [10 pixels, 100 pixels]. The metadata component properties provide additional information about a component. For example, a metadata component property may specify a name of the component, a component description, or a date or time stamp of component creation or last modification. The custom properties may be user-defined and can be specific to each component.

The component template store 230 stores component templates that may be selected and used in projects. The component template store 230 stores a variety of component templates that may be implemented in a view of a project. When a component template is selected and placed in a project, the placed component template generates a component in the project and the component is stored in association with the project in the project store 210. In some embodiments, the component template store 230 is configured to allow for a designer to create new component templates and/or the modification of existing component templates in the component template store 230.

The source data store 240 stores source data in the form of source data models. A source data model comprises data values structured into a source hierarchy where a source hierarchy is a data structure, such as a tree structure. Source data may be received by the gateway system 130 from a data production system 140. As described above, a data values are tuples of one or more values of various types. Value types include a Boolean type, a number type (e.g., INT2 type, INT4 type, INT8 type, FLOAT4 type, FLOAT8 type, etc.), a string type, a date and/or time type, a color type, etc.

PLC tags are one type of data that can be stored as data values in a source hierarchy (e.g., a hierarchical nested structure) within the source data store 240. That is, a hierarchy of data values (e.g., PLC tags) may be used to represent a set of values and how they relate to an entity such as various values associated with a piece of machinery. For example, an oven may be represented by an "oven" data value or PLC tag, which may have child data values associated with PLC tags that report temperature, humidity, pressure, and the like. Data values in the source data store 240 (i.e., in a source data model) can be arranged in inheritance trees, like objects in an object-oriented programming scheme. In some embodiments, this allows data bindings to dynamically reconfigure structural information of user interface components to match the structure of a data value object. For example, a designer may use the system to design a screen set up to show one oven with a dropdown menu that allows the user to select from among 1000 available ovens to view. In this example, the graphical user interface at a client 110 would update in real time to show the user the selected oven, without the designer having to have individually configured each of the different oven views manually when designing the GUI. Instead, the designer would have configured the view to show an oven object and then the gateway system 130 can determine which properties and components to display for each of the individual ovens based on the PLC tags and other data values in the source data model for each of the ovens. This can also be useful in cases of user defined types of source data models, such as when a designer defines an inheritance tree source hierarchy for a new set of sources.

In one embodiment, a data model may correspond to an entity associated with a data source or industrial process. For example, a data model associated with an oven via a data production system 140 may comprise a set of data values corresponding to oven name, oven temperature, oven humidity, and the like (e.g., as obtained from PLC tags). A data model may also comprise subsets including other data models. For example, a data model associated with all of the ovens in an industrial bakery might include a first data value indicating a number of ovens and may further include an array comprising data models for each of the ovens. In this way, data models are structured into a hierarchy.

As another example, a data model could include data received from a data production system 140 comprising a web server that hosts a RESTful API. The data model in such a case may comprise data values from a response to a query of the API, preserving the structure of the query response in the structure of the data model. For example, if the API response is received in JavaScript Object Notation (JSON), the data model store 240 stores the data values in the same hierarchical structure as the JSON response. Notably, a data model does not necessarily include identifications of the individual data values, as is the case of data stored in the component property store 220 in which data values are stored in association with component properties.

The binding store 250 stores information about data bindings. A data binding is an association between one or more data values from a data source such as a data production system 140 and one or more component properties (stored as information at nodes) in the component property store 220. A data binding may establish a relationship between a single component property and a single data value from a data production system 140, or a data binding may establish a relationship between a subtree of a component model and a subtree of a source data model (i.e., establishing a binding between multiple data values and multiple component properties at once). As an example of a binding between a single component property and a single data value from a production system 140, a designer may specify a data binding between an oven component's component property for "color" and a data value representative of the actual oven temperature, and may configure the GUI such that the oven component's color will change from green to red when a data value received from the data production system 140 indicates that the oven temperature is over 500 degrees Fahrenheit. As an example of binding a subtree of a component data model to a subtree of a source data model, a designer may specify a binding that associates a component data model that represents an oven to source data model that includes the data values associated with the oven. That is, when any of the data values associated with the oven change (e.g., temperature, humidity, etc.) those data values with corresponding component properties in the bound oven component in the component property store 220 will update accordingly.

In one embodiment, the binding store 250 records data bindings in the form of data paths that are associated with source data models. That is a data path from a root directory of a project may lead to a particular component data model and may be stored in association with a source data model to indicate that the data values in each should update to match each other. In one embodiments, the binding store 250 may further include metadata about a data binding, such as information about how often to update the data binding or information about actions to perform in response to a change in a data value from either the source data model or the component data model. In an alternate embodiment, metadata about the binding associations and actions may be stored in the component property store 220 in association with the relevant component data rather than in a binding store 250.

A binding may also be configured using a "transform" wherein a data value at a node of the component data model and a data value from the source data model are related, but may not be equivalent values or matching types. For example, a binding stored in the binding store 250 may include a configuration indicating that a color property of a component is bound to a numeric value in the source data model. The configuration includes a transform indicating a rule or function that dictates how a component property value should change when a source data value it is bound to changes (and a rule or function describing the transformation in the other direction). In the number to color example, the color property might be set to turn the component red when the associated number is greater than 100 and green when the associated number is 100 or less. Other examples of transforms that may be included in a binding configuration include functions, scripts, set of rules, formatting changes, and the like.

The binding module 260 monitors and manages data bindings stored in the binding store 250. When the binding module 260 receives a notification that a data value or source data model stored in the source data store 240 has changed, the binding module 260 identifies whether that data value is included in a data binding by referencing the binding store 250 and updates the data value for the associated component property or component data model. Similarly, when the binding module 260 receives a notification that a data value for a component property or a component data model stored in the component property store 220 has changed, the binding module 260 determines whether that component property or component data model is included in a data binding by referencing the binding store 250 (or by referencing configuration data about the node stored in the property tree) and updates the data value in the associated source data model accordingly. For example, if one data value associated with a node in a subtree of a component hierarchy of a component data model is changed, the binding module 260 updates the associated component data value within a subtree of the bound source data model at the corresponding position in the source hierarchy.

In addition to updating data values to reconcile component data models and source data models that are bound together, the binding module 260 may also update the structures of the bound component data models and source data models to match. That is, the binding module 260 updates the structure of a subtree of a property tree for a component data model in response to a structural change in the subtree of the source hierarchy for the source data model to which the component data model is bound. For example, a subtree of a component data model may include nodes that represent a set of four oven components, and the subtree of the component data model may be bound to a subtree of a source data model for data coming from a data production system 140 at an industrial bakery. The industrial bakery may add an additional oven to the bakery system and update the data production system 140 such that the data values in the source data model, as received from the data production system 140 include an additional set of data values related to the new oven. This would have the effect of updating the structure of the source hierarchy such that the subtree that includes the information about the individual ovens includes an additional set of data values for the new oven. When the gateway system 130 receives and stores the updated source data model in the source data store 240, the binding module 260 accordingly identifies the subtree of the property tree that is bound to the subtree of the source data model. The binding module 260 updates the component hierarchy of the component data model such that the subtree of the component data model includes a set of component properties for the new oven. In one design configuration, this change may further affect the display of the GUI, such that a component representing the new oven may be displayed. Updating the structure of the component hierarchy based bindings between the structures of the data (rather than just between individual values and component properties) in this way can be advantageous because it allows industrial systems with hundreds or thousands of processes and machines to adapt industrial system structures and data sources without the need for a designer to reconfigure and assign individual data bindings every time the configuration of the industrial system changes. Data bindings are further described in the detailed descriptions of FIGS. 3-5.

The client profile store 270 stores client profiles for clients 110 and 115 in communication with the gateway system 130. The client profile store 270 maintains a client profile for each client 110 in communication with the gateway system 130. Client profiles may include various information including identifiers (e.g., IP address, MAC address, Bluetooth address, etc.), historical logs, accessibility settings, generated reports, current or historical geolocation(s) according to established gateway sessions, etc. In some embodiments, projects are only designated for access by permitted client profiles. Only clients 110 with client profiles that have been granted access can access projects by the gateway system 130. In other embodiments, the client profile store 270 may classify certain client profiles associated with design clients 115 with the permission to access the design module 280 to provide one or more modifications to one or more projects in the project store 210.

The design module 280 generates and modifies projects in the project store 210. The design module 280 may generate new projects that may be stored in the project store 210. When generating a new project, the design module 280 may also define a structure of the project in a project navigation hierarchy a tree structure of including number of pages, number of views per page, number of containers or components per view, number of components per container, etc. In some embodiments, a page may contain any combination of pages, views, containers, and components. In some embodiments, a view may contain any combination of views, containers, and components but not pages. In some embodiments, a container may contain any combination of containers and components but neither pages nor views. Once a structure of the project is defined, the design module 280 may set one or more properties of items in the project. For example, the design module 280 may set one or more properties such as the name of each of the pages, sizes of each view within a page, a color background of views within a page, etc. To place components in the project, the design module 280 retrieves a component template from the component template store 230. Once a component template is retrieved, the design module 280 places a component in the project based on the retrieved component template. The design module 280 may further set properties of the added component. In some embodiments, the design module 280 receives a request to establish a data binding between a component property and a source data model. In these embodiments, the design module 280 provides the request including the component property and the source data model to be bound together with the data binding to the binding module 260. Once a project is created, the design module 280 may modify projects in the project store 210.

In some embodiments, the design module 280 may set accessibility settings for each project. For example, the design module 280 assigns one or more design clients and their corresponding client profiles with access to certain projects. When a design client 115 attempts to communicate with the design module 280 to edit a project, the design module 280 may verify that the design client 115 is associated with a client profile that has designated with access to editing the project. Once verified, the design client 115 provides input corresponding to edits of the project to the design module 280 through a design GUI which then causes the design module 280 to edit the project in the project store 210. In other embodiments, the design module 280 may set tiers of accessibility settings for clients. For example, a first tier allows editing of certain items in the project (e.g., views and components), a second tier allows editing for all components in the project, a third tier allows editing of one or more designated components in the project, and a fourth tier allows viewing of the project, etc.

The client interfacing module 290 moderates communication between the gateway system 130 and one or more clients 110 or 115. The client interfacing module 290 receives a request from one or more clients 110 or 115 to communicate with the gateway system 130 for accessing a project in the project store 210. Each request by a client 110 or 115 may include a client profile identifier that specifies a client profile associated with the client 110 or 115 and may further include a project identifier that specifies a project in the project store 210. In further embodiments, a request includes a type of client (e.g., application on an external device communicating with the gateway system 130, a web browser on a mobile device, etc.). In other embodiments, a request also includes one or more inputs that may affect display of the project. For example, the request may be a URL web address that also provides an input to a component property in the project. The client interfacing module 290 may access a client profile store 270 to identify a client profile for each client based on the client profile identifier. The client interfacing module 290 then accesses the project store 210 for the project that is requested to be accessed by the client. The client interfacing module 290 may further verify accessibility settings for the project against the client profile to determine what access to provide the client. In embodiments described above with tiers of accessibility, the client interfacing module 290 determines a set of operations that the client is permitted. If the client is a design client 115 as determined by the client profile of the design client 115, the client interfacing module 290 may provide the design client 115 with complete access to modify the project. Once a client profile is verified to have access to the project, the client interfacing module 290 generates a gateway session for the client 110 or 115 through which the client interfacing module 290 may provide a GUI or a design GUI.

The client interfacing module 290 provides a graphical user interface (GUI) to a client 110 for accessing a project. In one instance, the client 110 is permitted to view the project in the project store 210 based on accessibility settings. The client interfacing module 290 accesses the project store 210 to retrieve the requested project. The client interfacing module 290 renders a GUI that presents the project to the client 110 based on properties stored for the project. In embodiments where the project includes one or more components, the client interfacing module 290 accesses the component property store 220 to retrieve data values corresponding to component properties. Based on the retrieved data values for the component properties, the client interfacing module 290 may render the components of the project in the GUI. The GUI generated by the client interfacing module 290 for the client 110 will be described further below in FIGS. 6, 10, and 11A-B.

In some embodiments, the client 110 may have permission to provide one or more inputs to component properties in a project. The client interfacing module 290 may receive the one or more inputs to the component properties and may provide the inputs to the component property store 220. In some embodiments, the client 110 provides data values assigned to one or more of the component properties which are then populated in the component property store 220 by the client interfacing module 290. The client interfacing module 290 may update the GUI in response to the provided inputs to component properties.

The client interfacing module 290 provides a design GUI to a design client 115 for modifying a project. In one instance, the design client 115 is permitted to modify the project based on accessibility settings. The client interfacing module 290 accesses the project store 210 to retrieve the requested project. The client interfacing module 290 renders a design GUI that presents the project to the client 110 based on properties stored for the project. In embodiments where the project includes one or more components, the client interfacing module 290 accesses the component property store 220 to retrieve data values corresponding to component properties. Based on the retrieved data values for the component properties, the client interfacing module 290 may render the components of the project in the design GUI. The client interfacing module 290 also renders one or more additional design elements for aiding in modification of the project.

The design client 115 provides inputs through the design GUI which is then received by the client interfacing module 290. The client interfacing module 290 may relay the inputs to the design module 280 for modification of the project. The design GUI generated by the client interfacing module 290 for the design client 115 and its various graphical elements will be described further below in FIGS. 6, 7A-G, 8, and 9.

In some embodiments, a client 110 or 115 requests a specific item in the project for display in a GUI to the client 110 or 115. For example, a client 110 is attempting to view a page from a project and may then provide a request with a URL web address that may be used to retrieve the page by the client interfacing module 290. The client interfacing module 290 retrieves the project and identifies the specified item in the project. The specified item may be a specified page, a specified view, a specified container, or a specified component. The client interfacing module 290 determines what other items are contained with the specified item. The client interfacing module 290 then retrieves properties from the project store 210 and/or component properties for components within the specified item. The client interfacing module 290 then generates a GUI with the retrieved properties and component properties and presents the GUI to the client 110 or 115. In further embodiments, the client 110 or 115 may provide navigational inputs to display another item in the project. For example, the client 110 or 115 provides a navigation input to change from one page to another; in response, the client interfacing module 290 identifies the subsequent page to be displayed and updates the GUI to display the subsequent page.

Binding System

Figure 3:
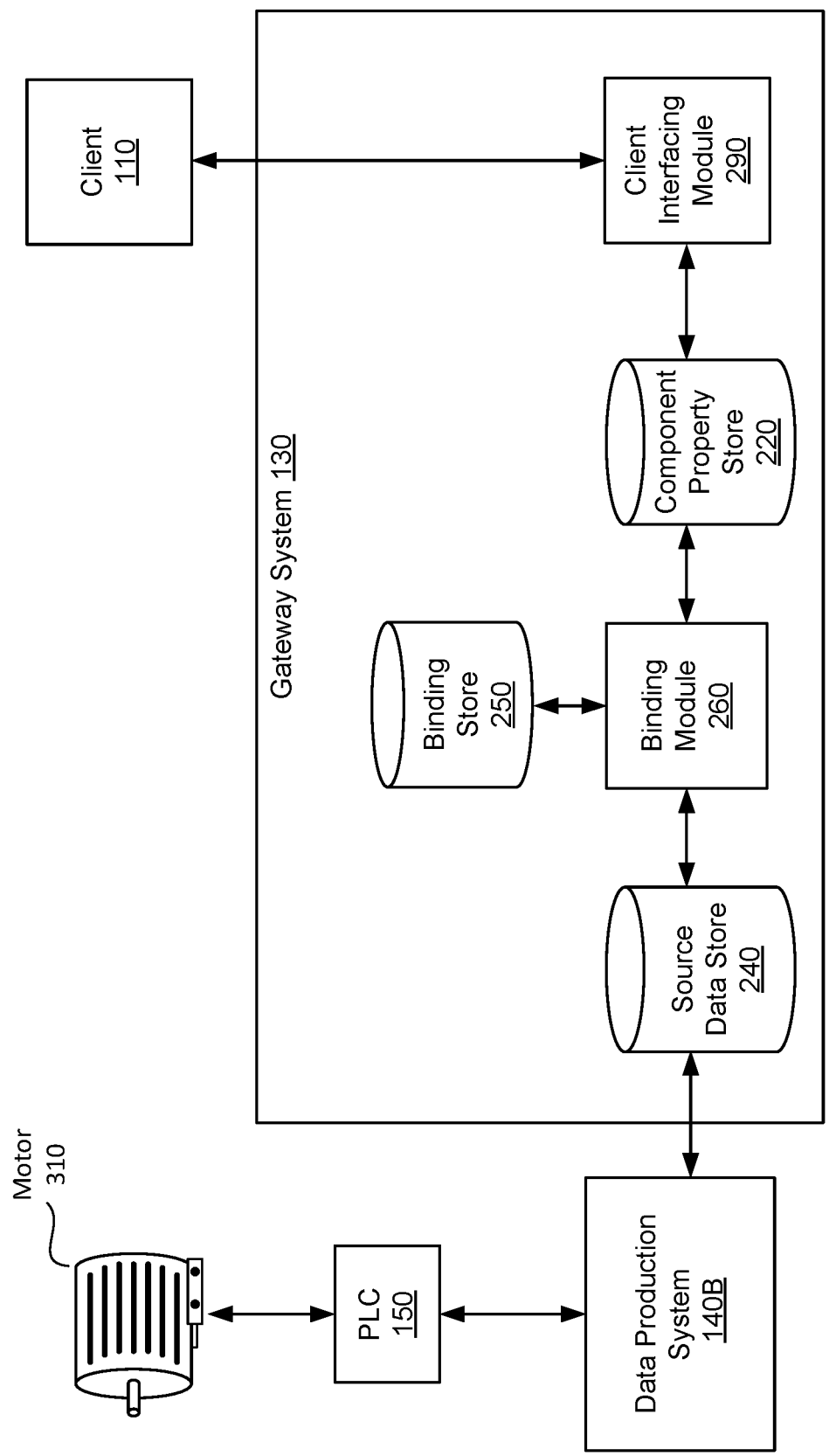
FIG. 3 is a high-level data flow diagram illustrating interactions between components of a data production system, a gateway system, and a client.

FIG. 3 is a high-level data flow diagram illustrating interactions between components of a data production system 140, a gateway system 130, and a client 110. In particular, FIG. 3 shows one example configuration by which information may transfer between a motor 310 (e.g., as involved in an industrial process) and a client 110.

The motor 310 is coupled to a PLC 150 which monitors and controls the motor 310. For example, the PLC may monitor whether or not the motor 310 is running and the current speed of the motor 310. In some cases, the PLC can also control the state of the motor 310 such as by turning the motor 310 on or off, or by adjusting the speed of the motor 310. The PLC 150 may send data about the motor 310 to a data production system 140, such as an OPC server which provides a bridge for software systems such as a gateway system 130 to communicate with process control hardware such as a PLC 150. In some embodiments, the PLC 150 provides PLC tags that may be tuples of data values. The tuples include three data values that can be a scalar value, a quality value, and a timestamp value.

In one embodiment, when the data production system 140 provides data about the motor to the gateway system 130, the data values are stored in the source data store 240. The data values in the source data store 240 may be stored in a source hierarchy structure. The gateway system 130 may notify the binding module 260 that new data has been received from the data production system 140. In some embodiments, the binding module 260 may periodically check the source data store 240 to determine if any data has been changed.

The binding module 260 determines whether the updated data in the source data store 240 is associated with any bindings, configurations of which may be stored in the binding store 250. In some embodiments, binding configuration may alternately be stored in the component property store 220, rather than in the binding store 250. If the binding store 250 includes a record of a binding between the updated data in the source data store 240 and a subtree of a component data model, the binding module 260 updates the corresponding data values at nodes of the subtree of the component data model stored in the component property store 220.

Updated data in the component property store 220 may be used by the client interfacing module 290 when it generates information about changes to the display of the component within a user interface at clients 110.

When a data binding stored in the binding store 250 is configured to be "bi-directional," the flow of data may also occur in the other direction. That is, in the case of a bi-directional binding, changes made by a user via interactions with a component in a user interface on a client 110, will propagate through the client interfacing module 290, the component property store 220, the binding module 260, the source data store 240, and the data production system 140, to the PLC 150 which can control the state of the motor. For example, a user may turn the motor off via a component in the user interface at the client 110, and the motor 310 will shut down accordingly.

Figure 4A:
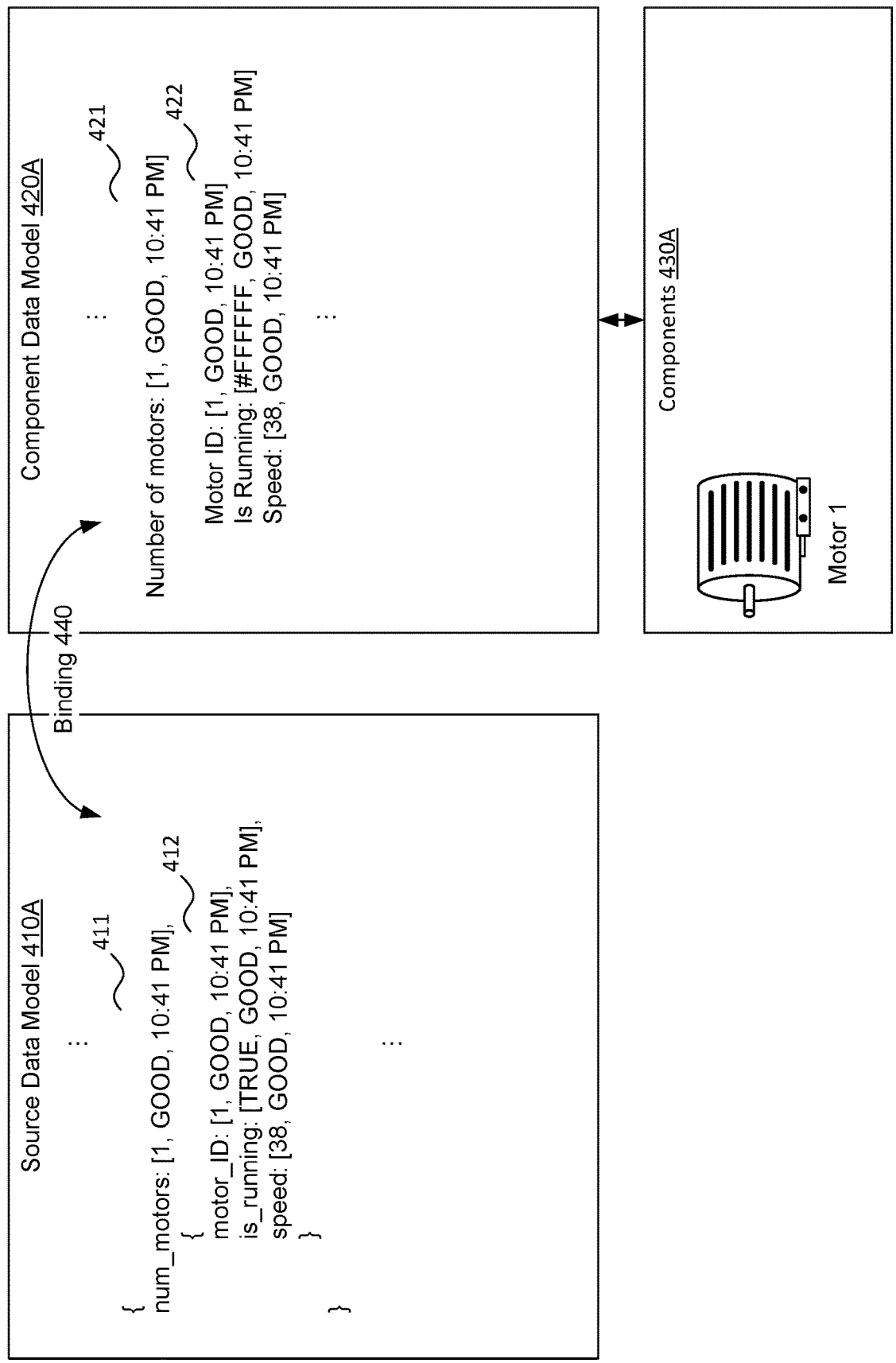
FIG. 4A depicts an example of a binding between a subtree of a source data model and a subtree of a component data model in accordance with an embodiment.

FIG. 4A depicts an example of a binding 440 between a subtree of a source data model 410A and a subtree of a component data model 420A in accordance with an embodiment. The example depicts a subset of a source data model 410A and shows data, structured in a source hierarchy, such as might come from a data production system 140. In the example of FIG. 4A, the source data comes from a motor and may be presented in a JSON format. The source hierarchy of the source data model 410A includes a data value 411 indicating a number of motors, and subset 412 of three data values associated with the motor. The three data values in the subset 412 of the example include an identification number for the motor, a Boolean indicating whether the motor is running, and the speed of the motor. In one embodiment, the data values comprise a tuple that includes the value, a quality, and a timestamp value.

The component data model 420A includes a property tree with nodes describing the component properties associated with a component 430A that represents the motor. Since a binding is established between the subtree of the component data model 420A and the subtree of the source data model 410A. In one embodiment, the component hierarchy (i.e., the structure of the property tree) in the component data model 420A matches the source hierarchy of the corresponding source data model 410A. As shown in the example of FIG. 4A, the subtree of the component data model 420A that describes the motor properties has a first node 421 that has a value of an array that includes one motor. The motor is further represented by a subset 422 of nodes having values representing an identification of the motor, whether the motor is running, and the speed of the motor.

Figure 4B:
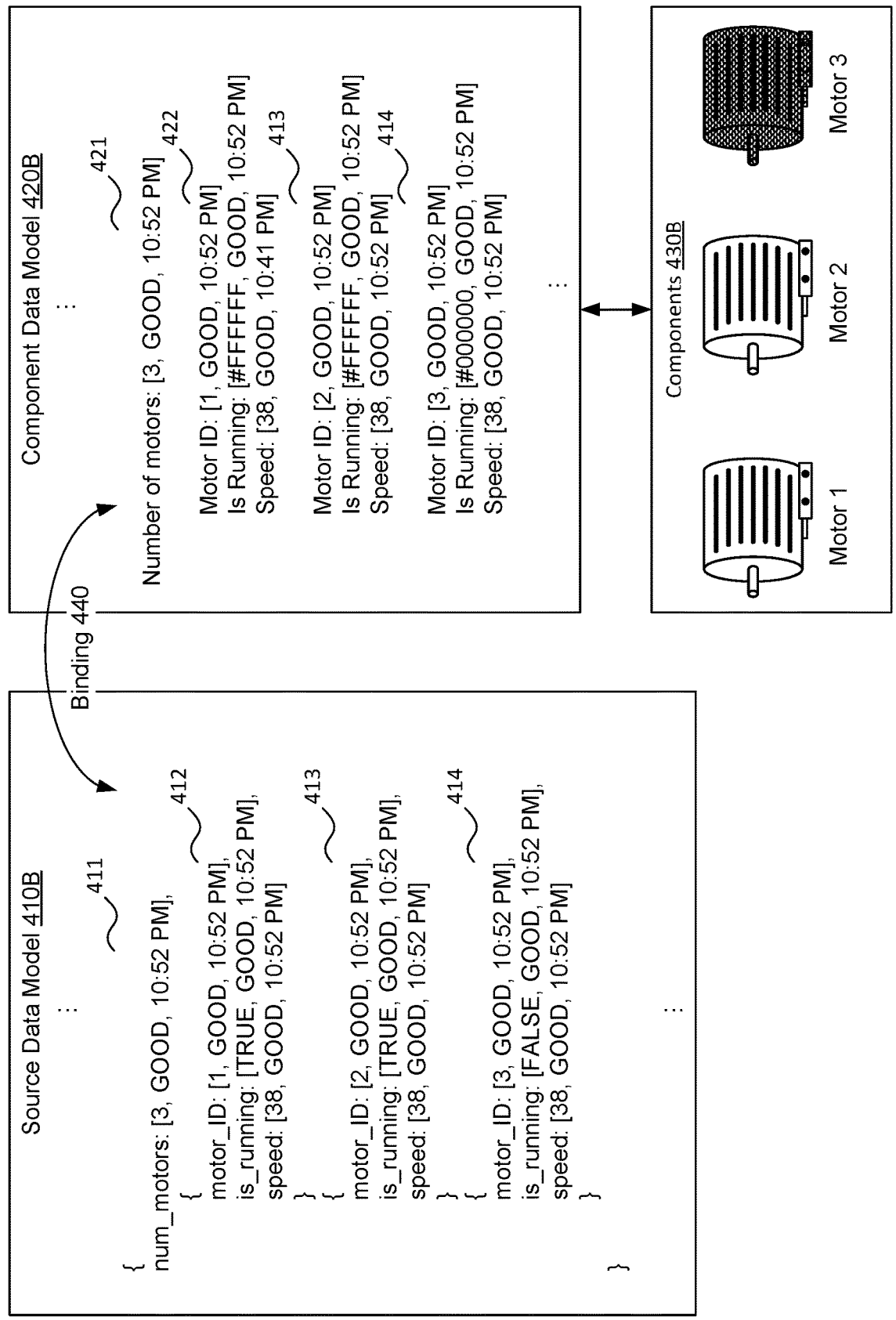
FIG. 4B depicts changes to the component data model resulting from updates to the structure of the corresponding source data model, in accordance with an embodiment.

FIG. 4A also includes an example component 430A, as may be displayed in a user interface of the client 110 to represent the motor. In the example, the binding 440 includes a transform configuration such that the Boolean "is running" value associated with a motor in the source data model 410A transforms into a color value (e.g., hexadecimal white indicating running and hexadecimal black indicating not running) that indicates visually in the user interface at the client 110 the running state of the motor FIG. 4B depicts changes to the component data model 420B resulting from updates to the structure of the corresponding source data model 410B, in accordance with an embodiment. In the example of FIG. 4B, the source data model 410A of FIG. 4A is updated to include data representing three motors. For example, a factory may have added two additional motors and its data production system 140 may have updated accordingly to send data about all three motors to the gateway system 130. After the update, the source data model 410B includes the data value 411 indicating the number of motors, the subset 412 of data values describing the first motor, and additional subsets 413 and 414 of data values describing the second and third motors, respectively.

Because a binding 440 exists between the subset of the source data model 410A and the subtree of the component data model 420A, the component hierarchy (i.e., the structure of the subtree) for the component data model 420B may update to match the new structure of the subtree of the source data model 410B. For example, the node 421 of FIG. 4B now includes two additional nodes 413 and 414 within its array which represent the additional motors.

The changes to the component data model 420B may affect the display of the components 430B in a user interface at the client 110. For example, in view of the updated component data model, the components 430B in FIG. 4B now include three motors, and the motor components are colored according to their running state based on the transform included in the binding configuration for the binding 440.

Data values for the source data model 410 may originate from a variety of data production systems 140. As described with respect to the gateway system 130, examples of data production systems 140 may include OPC servers, web servers providing RESTful APIs, databases, the component property store 220 itself, scripts, and expressions. In some embodiments, the structure of the data as received from one of the production systems 140 may affect the structure of the source hierarchy of the source data model 410, and may consequently affect the structure of subtrees of the component data model to which subtrees of the source data model may be bound. For example, a JSON document received in response to a query to a RESTful API at a web server may provide structured source data instead of or in addition to source data from a PLC.

The gateway system 130 may support a variety of binding types for associating data from various sources with components. The following are several examples of different binding types including example property tree layouts for configuration property trees that may be used to define configuration information for components with such bindings. The examples below are examples in which the binding configuration information is stored in the component property store 220 as paths included inside a configuration property tree, rather than in a binding store 250.

A property binding is used to bind a component property to another component property in the same view. Bi-directional read and write is supported with property bindings. An example component hierarchy for a property tree associated with the configuration of a component that has a property binding is:

```
type: property
Config schema:
{
  "type": "object",
  "properties": {
    "path": {
      "type": "string",
      "description": "Path to the property that drives this binding."
    },
    "bidirectional": {
      "type": "boolean",
      "default": false
    }
  },
  "required": [ "path" ],
  "additionalProperties": false
}
```

An Expression Binding is used to bind a property to the value of an expression. The expression may reference other properties within the same view. An example component hierarchy for a property tree associated with the configuration of a component that has an expression binding is:

```
type: expr
Config Schema:
{
   "type": "object",
   "properties": {
      "expression": {
         "type": "string",
         "description": "The expression source code."
      }
   },
   "required": [ "expression" ],
   "additionalProperties": false
}
```

A tag binding is used to bind a property to a tag, such as a data value from a data source like a PLC. Tag binding may be direct, if the path to the value is static, or indirect if the path to the value is dynamic and calculated with an expression form. Bidirectional read and write is supported for tag bindings.

```
type: tag
Config Schema:
{
   "type": "object",
   "properties": {
      "tagPath": {
         "type": "string",
         "description": "The path to the tag to bind to"
      },
      "bidirectional": {
         "type": "boolean",
         "default": false
      }
   },
   "required": [ "tagPath" ],
   "additionalProperties": false
}
```

Figure 5:
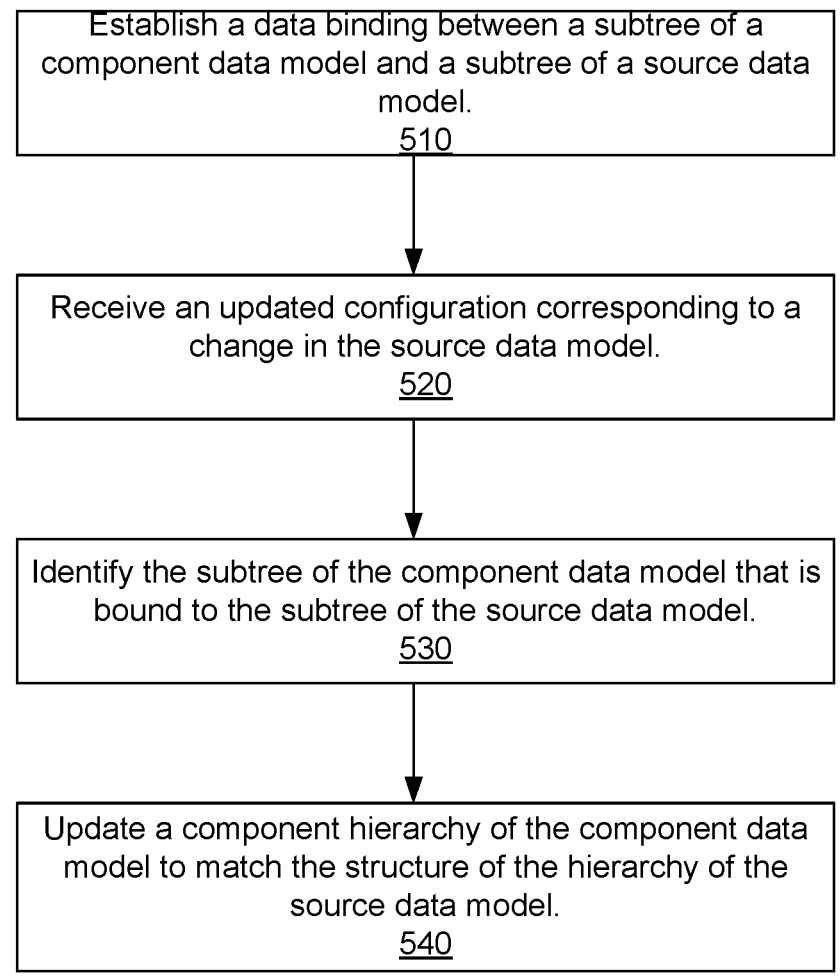
FIG. 5 is a high level flow chart that describes a process for updating a component hierarchy structure that is bound to a source hierarchy structure in response to changes to the source hierarchy structure, in accordance with an embodiment.

FIG. 5 is a flow chart that describes a process for updating a component hierarchy structure that is bound to a source hierarchy structure in response to changes to the source hierarchy structure, in accordance with an embodiment. A data binding is established 510 between a subtree of a component data model (comprising one or more property trees) and a subset of a source data model, e.g., by binding module 260, which is one means for so doing. Establishing the binding may include storing a path associating a node at the root of a subtree of the component model with a set of data values in a source data model, e.g., in binding store 250. Additional configuration information about the binding may be stored in addition to the path, including information about transforms, scripts to run in response to events related to changes to binding values, and an indication of whether the binding is bi-directional.

The gateway system 130 receives 520 an updated configuration corresponding to a change in the source data model. For example, the structure of the source data model may change to include additional data values. In response to the structural change to the source data model, the gateway system 130 identifies 530 the subtree of the component data model that is bound to the subset of the source data model that was updated, e.g., by binding module 260. The identification is based on the binding that is stored in the binding store 250.

Having identified the bound sets of data values, the gateway system 130 updates the component hierarchy (i.e., the structure of the subtree of the property tree) to match the updated structure of the hierarchy of the source data model.

Design Graphical User Interface for Editing Projects

Figure 6A:
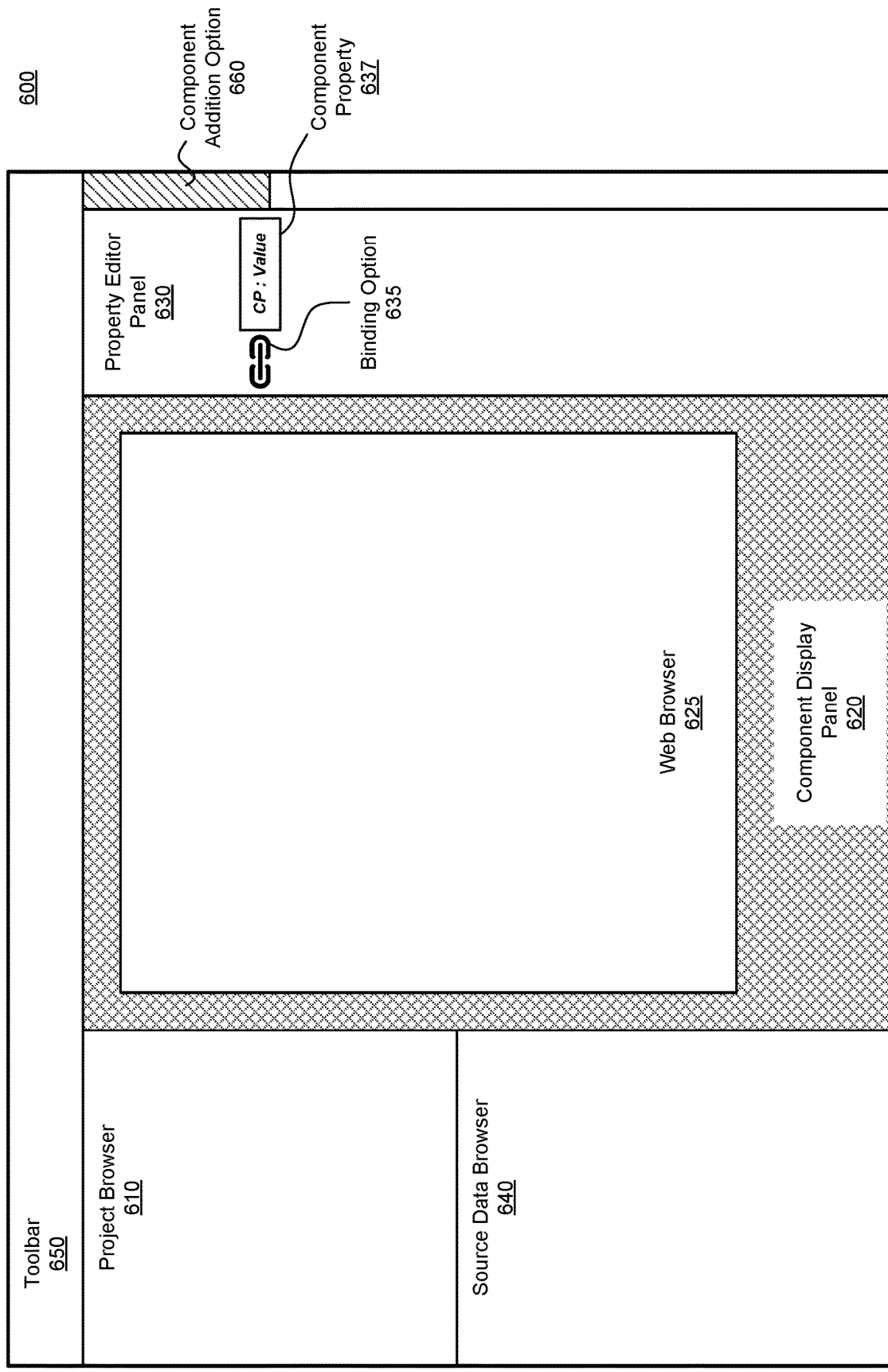
FIG. 6A is an illustration of a design graphical user interface (GUI), in accordance with one or more embodiments.

FIG. 6A is an illustration of a design graphical user interface (GUI) 600, in accordance with one or more embodiments. The client interfacing module 290 generates the design GUI 600 and provides the design GUI 600 to one or more design clients 115 for modification of one or more projects. The design GUI 600 includes a project browser 610, a component display panel 620, a property editor panel 630, a source data browser 640, and a toolbar 650 which are graphical elements in various portions of the design GUI 600. In addition, the design GUI 600 may have one or more options that are graphical elements displayed and configured to receive one or more inputs. In particular, the design GUI 600 has a binding option 635 and a component addition option 660. In other embodiments, the design GUI 600 may have additional or fewer graphical elements than those listed herein. Additionally, the functions described for the listed graphical elements may be variably distributed amongst the other graphical elements. In other embodiments, the placement of the graphical elements relative to one another in the design GUI 600 may be different.

The project browser 610 displays a project navigation hierarchy. In the illustration of FIG. 6A, the project browser 610 is placed in a top left portion of the design GUI 600. The project browser 610 may also be referred to as a project browser portion of the GUI 600. The client interface module 290 generates the design 600 for presentation and modification of a requested project from the project store 210 of the gateway system 130. The retrieved project may have many items such as pages, views, containers, and/or components included in the project. These items in the project may be structured in a project navigation hierarchy, which is described further in detail in the discussion of the project store 210 of FIG. 2. In the project navigation hierarchy, there may be any number of pages, any number of views, any number of containers, or any combination thereof arranged in a tree structure. The project browser 610 may present one or more items in the project navigation hierarchy. In other embodiments, the project browser 610 is configured to receive an edit input to edit one or more properties of items in the project hierarchy.

In some embodiments, the project browser 610 is configured to receive a navigation input of navigating to a page, a view, a container, or a component in the project navigation hierarchy. For example, the designer using the design GUI 600 may provide, via a design client 115, a selection input of a view in the project. In response to selection of the view in the project browser 610, the project browser 610 visually distinguishes the selected view in the project browser 610. Moreover, the client interface module 290 may update other graphical elements in response to the selection input of the view.

In other embodiments, the project browser 600 is configured to receive a navigation input of maximizing or minimizing items contained in another item. For example, the designer may provide, via a design client 115, a maximization input of a page. In response, the project browser 610 updates display of the project navigation hierarchy to display one or more views, one or more containers, and/or one or more components under the page.

The component display panel 620 displays a view of a project. In the illustration of FIG. 6A, the component display panel 620 is placed in a middle portion of the design GUI

600. The component display panel 620 may also be referred to as a component display portion of the GUI 600. The component display panel 620 contains a web browser 625 that is another graphical element. The web browser 625 is a graphical element in the GUI 600 that presents visual information in a web page format. The web browser 625 displays a view that is currently selected in the project navigation hierarchy which serves as a representation of how other web browsers accessing the view would display the view. In some embodiments, the web browser 625 can display other items in the project as well, including a page or a container. When an input selecting a different view is received by the project browser 610, the component display panel 620 updates the web browser 625 to display the different view.

The component display panel 620 displays, in the web browser 625, one or more components in a selected view. The component display panel 620 displays any components previously placed in the selected view in the web browser 625, as well as new components added via the component addition option 660, which opens the component template library 670 (shown in FIG. 6B) for new component selection. The component display panel 620 displays each component according to a set of component properties that define an appearance of the component in the web browser 625. In additional embodiments, each component has one or more features that are graphical aspects to the component. For example, an oven component may have features that include a graphical thermometer scale, a visual representation of an oven, a graphical pressure scale, an oven volume capacity percentage, etc.

The component display panel 620 is configured to receive a selection input of a component that is displayed in the web browser 625. A designer may click on the component in the web browser 625. In response, the component display panel 620 may visually distinguish the selected component in the web browser 625. Additionally, the selection input may prompt other graphical elements to update.

The component display panel 620 is configured to also receive a movement input corresponding to moving a component within the web browser 625. In one example, the designer may click and hold the component in the web browser 625. The component display panel 620 may update display of the selected component to match movement of the designer's mouse or pointer used to click and hold the component. When the designer releases the component in the web browser 625, the component display panel 620 may update display to place the selected component at a position in the web browser 625 where the mouse or pointer was released. In some embodiments, the component display panel 620 relays the movement input of the component to the design module 280 which can update component properties in the component property store 220.

The property editor panel 630 displays a component data model associated with a selected component in the project. In the illustration of FIG. 6A, the property editor panel 630 is placed in a right portion of the design GUI 600. The property editor panel 630 may also be referred to as a property editor portion of the GUI 600. The selection input of the component may be received at the component display panel 620. When a component is selected, the property editor panel 630 displays the component data model associated to the selected component. The displayed component data model comprises a set of component properties that are structured in a component hierarchy. Each component property may have a data value which may also be displayed by the property editor panel 630. Pending any changes to the component properties, the property editor panel 630 updates the displayed set of components properties based on the changes.

The property editor panel 630 is configured to receive edit inputs corresponding to editing the component data model. In the displayed set of component properties, a designer may provide an edit input, via the property editor panel 630 for editing the component data model. The editing of the component data model may include any combination of adding/removing/updating a data value assigned to a component property, adding/removing a component property, naming/renaming a component property, moving a component property within the component data model, binding a component property (which will be described further in the binding option 635 and FIG. 6C). When the edit input is provided, the property editor panel 630 may relay the edit input to the design module 280 for updating the component properties in the component property store 220. In embodiments where the edit input corresponds to adding/removing/updating a data value assigned to a component property, the property editor panel 630 updates the component property in the displayed component data model to reflect the addition/removal/update of the data value. In embodiments where the edit input correspond to adding/removing a component property, the property editor panel 630 updates the displayed component data model to reflect an added component property or a removed component property from the component data model. In embodiments where the edit input corresponds to naming/renaming a component property, the property editor panel 630 updates the component data model to display the updated name of the component property. In embodiments of the edit input corresponding to moving a component property within the component data model, the property editor panel 630 updates to reflect a change in the position of the component property with a potential change in the component hierarchy as well.

The property editor panel 630 also displays a binding option 635 next to one or more displayed components. The binding option 635 is a graphical icon that is configured to receive an input corresponding to establishing a data binding between a component and a source data model. In this illustration, the binding option 635 is shown as a visual representation of three links of a chain displayed on the left of a component property 637 in the property editor panel 630. In some embodiments, a binding option 635 is displayed by the property editor panel 630 next to each displayed component property. In other embodiments, when a mouse or pointer of a design client 115 hovers over a component property (e.g., the component property 637), the property editor panel 630 then displays the binding option 635 next to the component property. When the mouse or pointer of a design client 115 then hovers over the binding option 635, the property editor panel 630 may display text of "add binding." When the binding option 635 receives the input corresponding to establishing a data binding to the component property, the design GUI 600 displays an alternate window for completion of establishing the data binding (which will be described in more detail in FIG. 6C).

The source data browser 640 displays one or more source data models. In the illustration of FIG. 6A, the source data browser 640 is placed in a bottom left portion of the design GUI 600. The source data browser 640 may also be referred to as a source data browser portion of the GUI 600. The source data may be retrieved from the source data store 240 wherein the source data models are stored. Each source data model comprises data values structured into a source hierarchy. The source data browser 640 displays a source data model with the data values structured in the source hierarchy. In some embodiments, the source data browser 640 may receive an input specifying a source data model to be displayed. In embodiments where the data values are tuples of one or more data values of various types, the source data browser 640 may present one or more of the data values in the tuples. In one example of a source data as PLC tags provided by an OPC server, the source data may be provided in tuples including a scalar value, a quality value, and a timestamp value. In these examples, the source data browser 640 may present the three data values.

The source data browser 640 may have additional functions for navigating around source data models or for editing source data models. Similar to the navigation inputs discussed above in reference to the project data browser 610, the source data browser 640 may also receive one or more navigation inputs to navigate around various source data models. Similar to one or more edit inputs discussed above in reference to the property editor panel 630, the source data browser 640 may receive edit inputs that may correspond to adding/removing/updating a data value in a source data model, adding/removing a data value in the source data model, or moving a data value within the source data model. The source data browser 640 may additionally relay such edit inputs to the design module 280 for updating source data stored in the source data store 240.

The toolbar 650 displays one or more options configured to receive inputs. In the illustration of FIG. 6A, the toolbar 650 is displayed in a top portion of the design GUI 600. The displayed one or more options are graphical icons. When a designer, via a design client 115, clicks on one of the options, the toolbar 650 receives the input of selecting that option. The various options may include but is not limited to creating a new project, adding a page to an existing project, adding a view to an existing project, adding a container to an existing project, opening an existing project, saving a project currently being edited, undoing an input, redoing an input, cutting of an item in the project, pasting of an item into the project, deploying a project, refreshing the design GUI 600, etc. The option of opening an existing project may result in the design GUI 600 displaying in the project browser 610 (or another project browser that may pop up in the design GUI 600) various projects stored in the project store 210. In adding a page, a view, or a container to an existing project, the design GUI 600 may display in the project browser 610 an updated project hierarchy including the added item. Deploying of a project effectively opens access of the project from one or more clients 110 or 115 to access the project via gateway sessions hosted by the gateway system 130. Other inputs listed above are familiar operations in the software GUI field. In addition to the options listed above, the toolbar 650 may also include the binding option 635 and the component additional option 660.

Figure 6B:
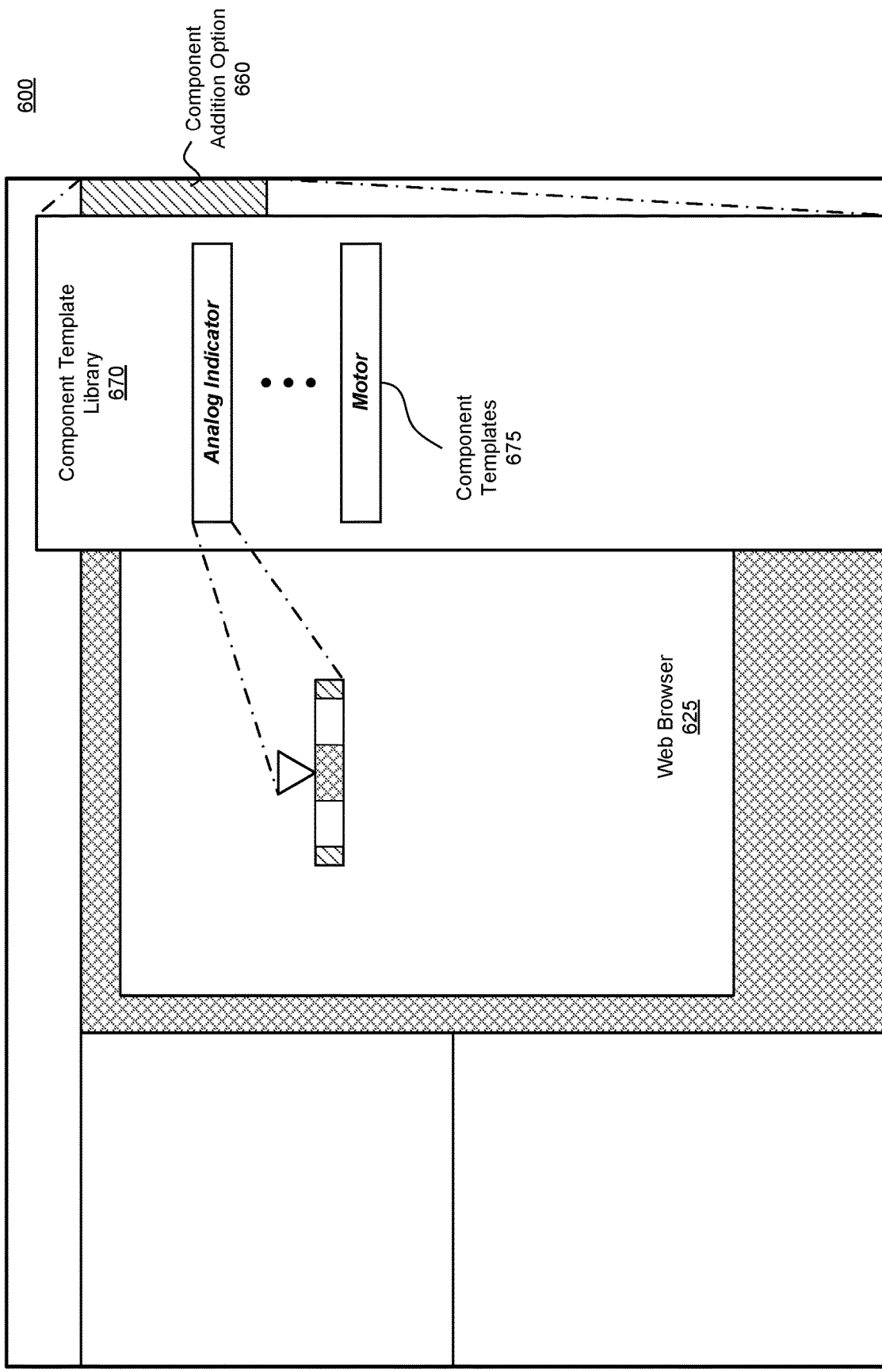
FIG. 6B is an illustration of the design graphical user interface (GUI) displaying a component template library, in accordance with one or more embodiments.

The component addition option 660 receives an addition input to add a component to a project, e.g., by activating the component template library 670 shown in FIG. 6B. The component addition option 660 is a graphical element that is configured to receive an addition input corresponding to adding a component to a current view being displayed in the component display panel 620. When an addition input is received by the component addition option 660, the design GUI 600 displays another graphical element to complete the addition of the component to the current view. In other embodiments, the component addition option 660 may be configured to generally receive addition inputs of items (e.g., a page, a view, a container, or a component) into the current view of the project.

FIG. 6B is an illustration of the design graphical user interface (GUI) 600 displaying a component template library 670, in accordance with one or more embodiments. In one or more embodiments, the design GUI 600 receives an addition input corresponding to adding a component to a current view in a current project —e.g., the addition input is received by the component addition option 660 of FIG. 6A. In response the received addition input, the design GUI 600 displays a component template library 670 that is a graphical element in a portion of the design GUI 600. In some embodiments, the component template library 670 is a pop-up window that populates a portion of the design GUI 600 when displayed.

The component template library 670 displays one or more component templates. The client interfacing module 290 may access the component template store 230 and retrieve component templates 675 for display in the component template library 670. In the illustration of FIG. 6B, the component template library 670 displays template list of component templates 675, e.g., that may include a component for an analog indicator and a component for a motor, for addition in the project. From the component templates 675 displayed, the component template library 670 is configured to receive an addition input corresponding to a selection a component template from the component templates 675. Once the component template is selected, the component display panel 620 displays a component according to the component template selected in the addition input. In other embodiments, the component template library 670 displays the component templates 675 as visual representations of the components. In some embodiments, when the addition input is provided, the component template library 670 may minimize out of view from the design GUI 600. In response to the addition input, the component display panel 620 may display the component in the web browser 625. The designer, via the design client 115, may then provide further input to the component display panel 620 to edit the component. When a component is added to a project, the component template library 670 relays the addition of the component to the project to the design module 280 which can then update the project within the project store 210. In addition, the design module 280 provides the component data model associated with the added component to the component property store 220.

In some embodiments, the component template library 670 receives an input to generate or modify a component template. Once the input to generate or modify a component template is received, the component template library 670 may display additional tools for shaping or defining the component template (e.g., shaping how the corresponding component appears, defining the component data model with the component properties structured in the component hierarchy). The generated or modified component template is provided to the design module 280 which may store the generated or modified component template in the component template store 230.

Figure 6C:
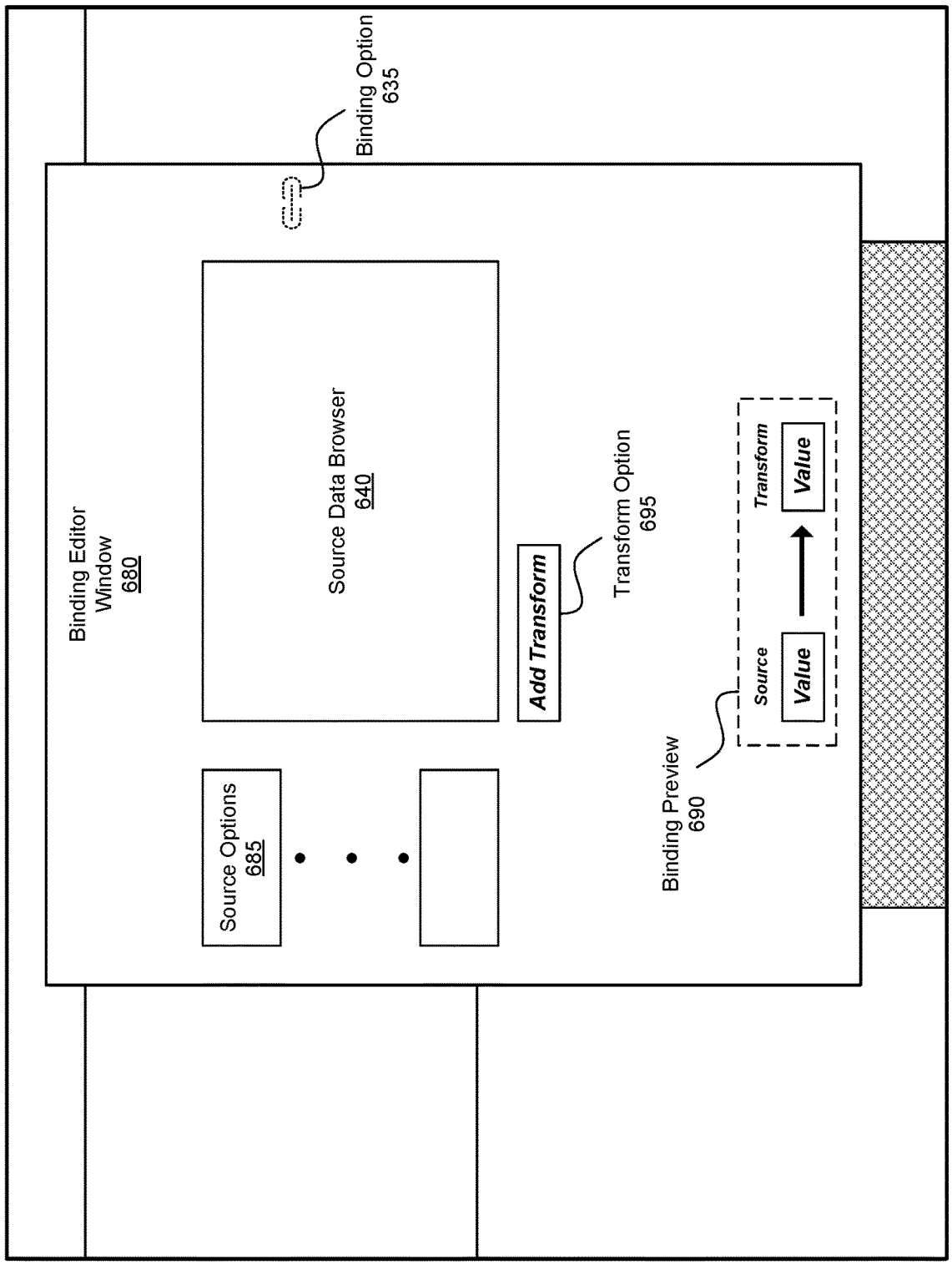
FIG. 6C is an illustration of the design graphical user interface (GUI) displaying a binding editor window, in accordance with one or more embodiments.

FIG. 6C is an illustration of the design graphical user interface (GUI) 600 displaying a binding editor window 680, in accordance with one or more embodiments. In one or more embodiments, the design GUI 600 receives, via the binding option 635, an edit input corresponding to establishing a data binding to a component property. In response to the received edit input, the design GUI 600 displays a binding editor window 680 that is a graphical element in a portion of the design GUI 600. The binding editor window 680 may also be referred to as a binding editor portion of the design GUI binding editor window 680. In some embodiments, the binding editor window 680 is a pop-up window that populates a portion of the design GUI 600 when displayed.

The binding editor window 680 displays one or more source data models for binding to the component property. The binding editor window 680 may also display a list of source options 685 that are configured to receive input of selecting that source option. Each source option may correspond to a data coming from a data source. For example, the sources may correspond to source binding types, such as tags, properties, expressions, expression structures, queries, tag histories, or HTTP sources. When a source option of the source options 685 is selected, the binding editor window 680 may display one or more source data models associated with the source option. Alternatively, the binding editor window 680 also displays a source data browser 640 that is similar in function to the source data browser 640 in that the source data browser 640 presents source data models and may receive input to navigate to find a source data model. The binding editor window 680 then receives a binding input corresponding to selecting a source data model for establishing a data binding between the source data model and the component property. When the binding input is received, the binding editor window 680 relays the binding input to the design module 280 which may then further relay the binding input to the binding module 260 for creating the data binding. In some embodiments, once the binding input is received, the binding editor window 680 minimizes out of view of the design GUI 300. In additional embodiments, the property editor panel 630 displays a binding icon next to the bound component property to designate that there exists a data binding between the component property and another source data model. The binding icon may be shaped similarly to the binding option 635 and may also receive edit input to edit the existing data binding. Additionally, the property editor panel 630 updates display of the component data model due to the binding input and the component display panel 620 may update display of the component due to the binding input.

The binding editor window 680 displays a binding preview 690 for providing a live preview of a data value from a source data model. The client interfacing module 290 retrieves one or more data values from a source data model that is in a data binding with a component property. The binding preview 690 displays the data values. For example, if the source data model comprises a single data value that is a date and time stamp, then the binding preview 690 displays a dynamic date and time stamp. In another example, the source data model comprises a single data value that is associated with rotation of a motor, then the binding preview 690 displays the data value associated with the rotation of the motor as the rotation dynamically changes.

The binding editor window 680 also displays a transform option 695. The transform option 695 is configured to receive inputs for adding one or more transforms to a data binding. Once the binding input is provided causing the data binding to be established between a component and a source data model, the data binding may be augmented with one or more transforms which transform data values from the source data model prior to being assigned to the component property. The transform option 695 receives inputs for adding the transforms and provides the added transforms to the design module 280 which may relay the transforms to the binding module 260 to store the transforms in association with the established data binding in the binding store 250. Once a transform is added to a data binding, the binding preview 690 may display a transformed data value from the source data model, providing a preview of the transformed data value to be assigned to the component property. For example, the data value from the source data model is a date and time stamp and the transform maps every odd second to a yellow color and every even second to a blue color. The binding preview 690 would display both the data value as the date and time stamp as well as the transformed data values which would be an alternation between the yellow color and the blue color every second. In additional embodiments, the binding editor window 680 further displays a transform editor panel for configuring the transforms to be added to the data binding.

FIGS. 7A-7G are examples of the design GUI 600 and its various graphical elements as described in FIGS. 6A-6C, in accordance with some embodiments.

Figure 7A:
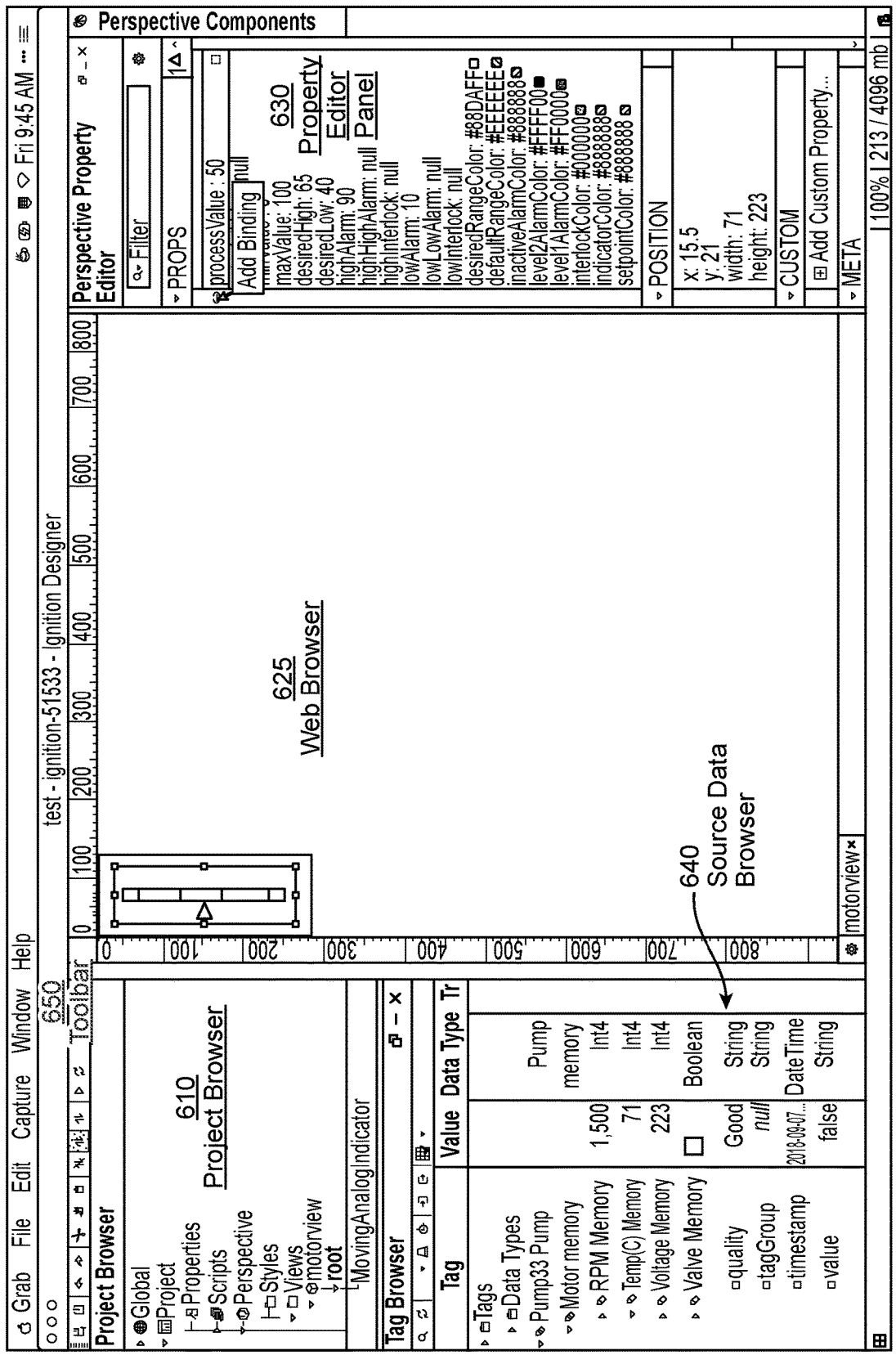
FIGS. 7A-7G are examples of the design GUI and its various graphical elements as described in FIGS. 6A-6C, in accordance with some embodiments.

FIG. 7A is an example of the design 600, in accordance with an embodiment. In this illustrative example, the design GUI 600 has the project browser 610, the component display panel 620, the web browser 625, the property editor panel 630, the source data browser 640, and the toolbar 650 along with the binding option 635 and the component addition option 660. In this illustrative example, the project browser 610 is the graphical element named "Project Browser" on the top left of the design GUI 600. The project browser 610 presents a project navigation hierarchy that presents projects stored in the project store 210. In this example, the project browser 610 is displaying a project navigation hierarchy associated with a project titled "Project." The project browser 610 is also visually distinguishing a view in the project titled "MovingAnalogIndicator" that is currently being displayed for edit, the visual distinction being highlighting the view blue in the project navigation hierarchy. Corresponding to the selected view, the component display panel 620 is displaying in the web browser 625, the selected view. In the web browser 625, the component display panel 620 is also displaying a component that is a moving analog indicator. In one example, the moving analog indicator component has features such as a linear scale and an arrow pointing to a position along the linear scale. Moreover, the linear scale has one or more portions that are visually distinguished by various color fills. The appearance of the component with its features is dependent on the component data model comprising the component properties with associated data values. The component display panel 620 is also visually distinguishing the component, with a blue outline around the component, as the component in the view has been selected. Corresponding to the selected component, the property editor panel 630 displays a component data model comprising the plurality of component properties associated data values. In this illustration, the property editor panel 630 is the graphical element named "Perspective Property Editor" and is also displaying the binding option 635 that receives the edit input to establish a data binding. In this illustrative example, the source data browser 640 is the graphical element named "Tag Browser" in a bottom left portion of the design GUI 600. The source data browser 640 displays one or more source data models retrieved from the source data store 240. The toolbar 650 also displays various graphical icons associated with various inputs for configuring the project. In addition, the component addition option 660 is displayed in a far right portion of the design GUI 600 for adding components to the current view in the project. In this illustrative example, the component addition option 600 is the graphical element named "Perspective Components."

Figure 7B:
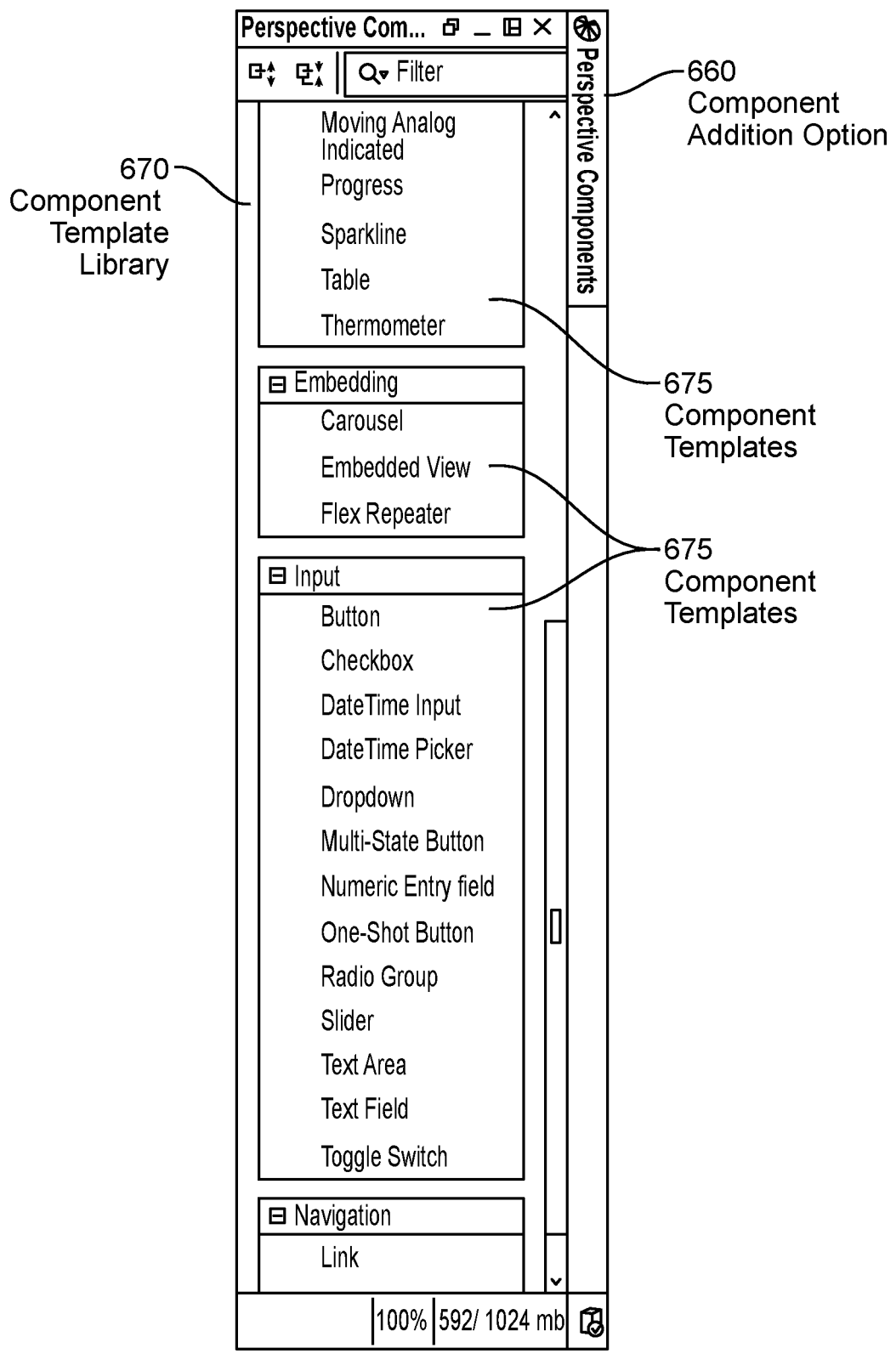

FIG. 7B is an example of the component template library 670 of the design GUI 600. In this illustrative example, the design GUI, via the component addition option 660, receives an addition input for adding a component to the current view of the project. In response to the addition input, the design GUI 600 displays the component template library 670 that displays one or more component templates 675. Each of the component templates 675 displayed provides a preview of a component associated with that component template. For example, the component template that appears as a motor corresponds to a component that would appear similarly in the web browser 625. Once a component template is selected from the displayed component templates 675, the component display panel 620 displays the component associated with the selected component template in the web browser 625.

Figure 7C:
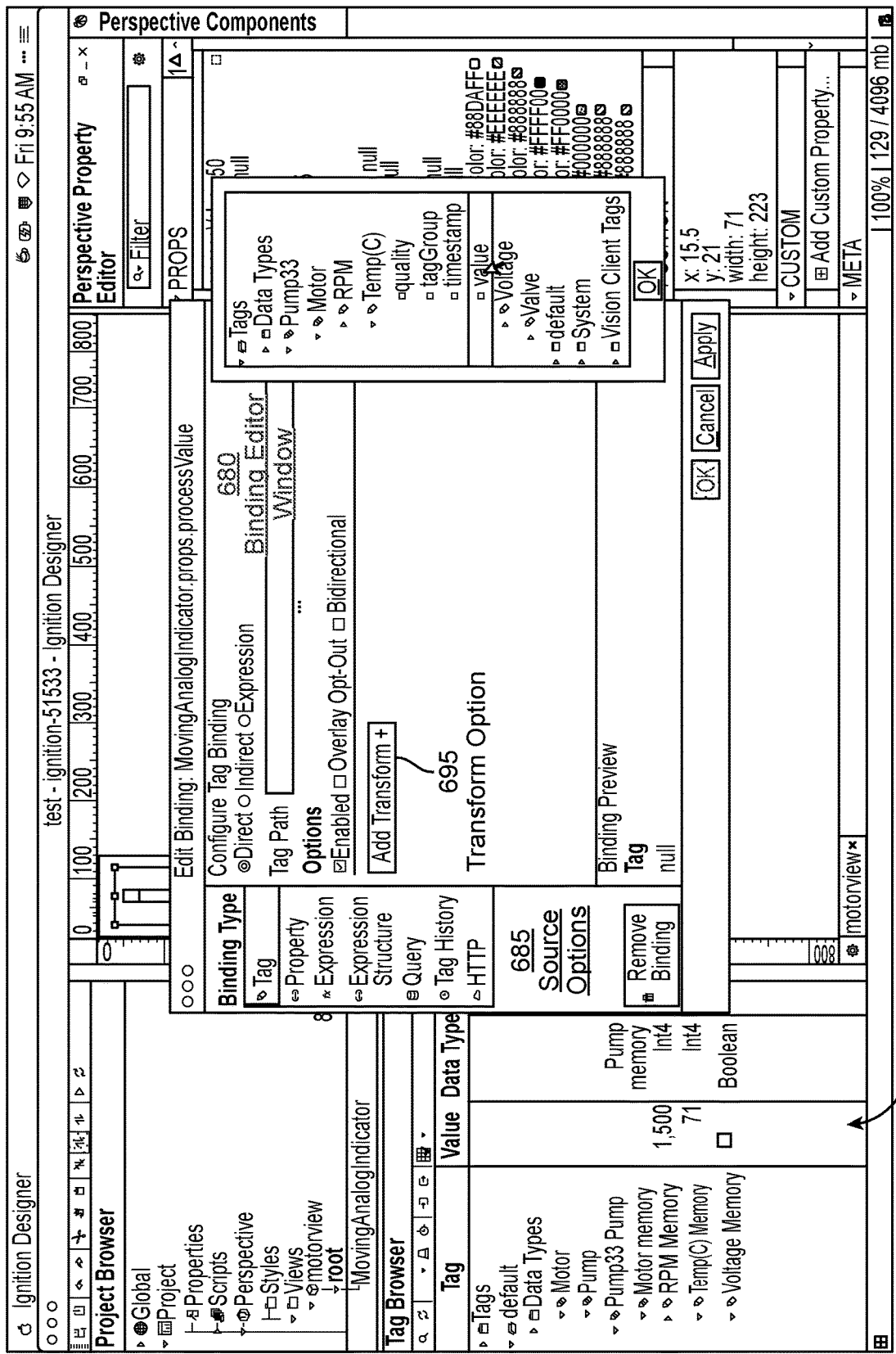

FIG. 7C is an example of the design GUI 600 displaying the binding editor window 680. In this illustrative example, the design GUI 600, via the binding option 635, receives an edit input for establishing a data binding with a component property. In response, the design GUI 600 displays the binding editor window 680. In this illustration, the binding editor window 680 displays a plurality of source options 685 on a top left portion of the binding editor window 680 and a source data browser 640 for navigating one or more source data models. In response to receiving a selection of a source option corresponding to a PLC tag source, the source data browser 640 displays one or more source data models in the source data store 240 that may be selected for establishing the data binding. In this illustration, the binding editor window 680, via the source data browser 640, receives a binding input corresponding to establishing a data binding between the component property and the source data model titled "value." In one or more embodiments, the source data browser 640 visually distinguishes the selected source data model. Once the binding input is received, the design GUI 600 provides the binding option to the design module 280 or the binding module 260 for establishing the data binding in the binding store 250. In addition, the binding editor window 680 displays a transform option 695 to receive inputs to add one or more transforms to the data binding.

Figure 7D:
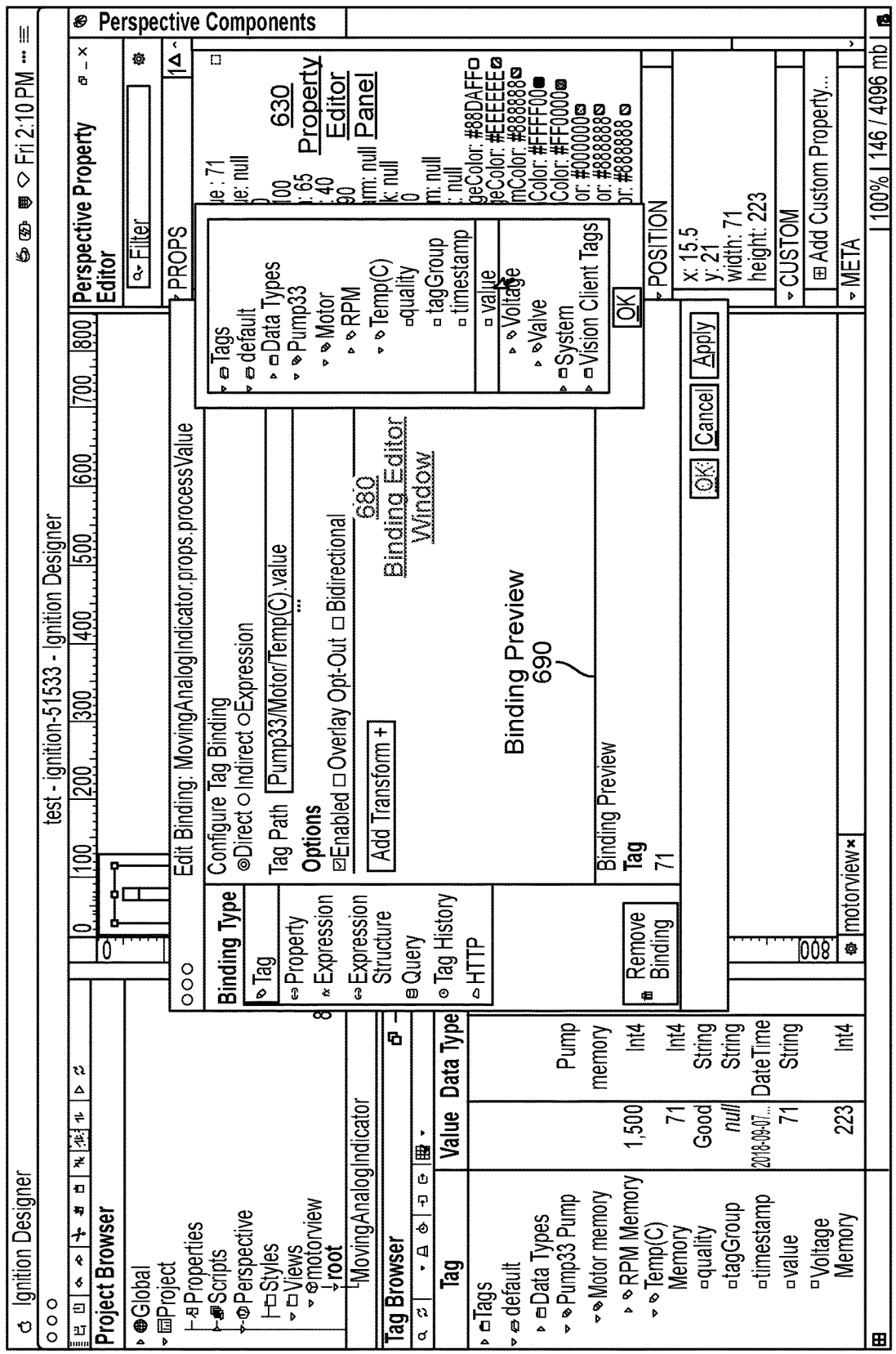

FIG. 7D is a continuation example of FIG. 7C, wherein the binding editor window 680 displays a binding preview 690. Once the binding input is received by the binding editor window 680, the binding editor window 680 may display the binding preview 690 displaying a current data value corresponding to the selected source data model in the binding input. In this illustration, the selected source data model is titled "value" and has a current data value of "71" that is displayed by the binding preview 690. Moreover in the illustrative example, once the binding input is received, the property editor panel 630 displays an updated component data model with a binding icon next to the component property with the recently established data binding. The updated component data model now reflects the component property titled "processValue" as having assigned a data value of "71" based on the current data value from the source data model titled "value" to which the component property "processValue" is bound.

Figure 7E:
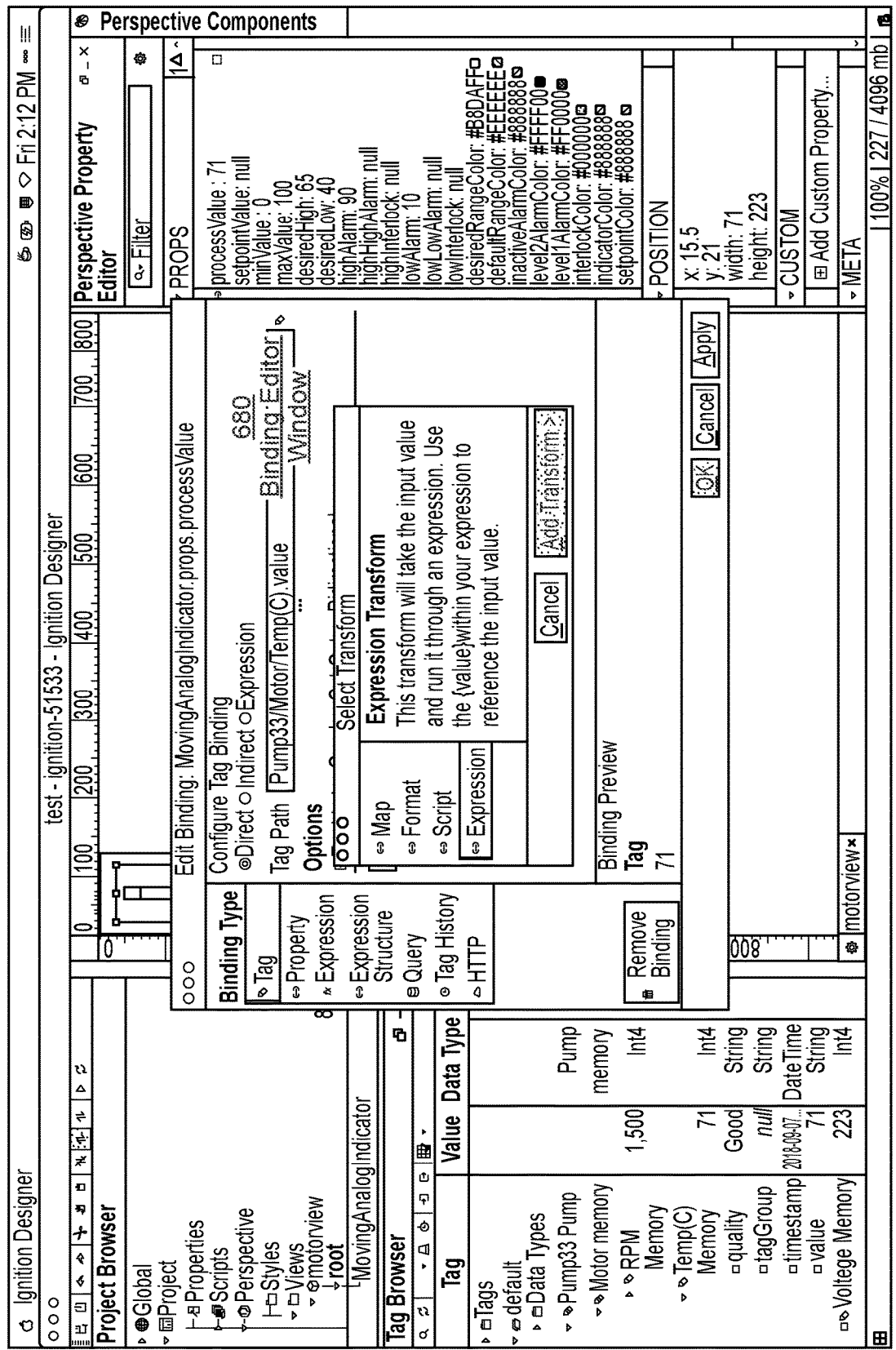

FIG. 7E is a continuation example of FIG. 7D, wherein an input is received to add one or more transforms to the data binding. The binding editor window 680, via the transform option 695, receives an input to add one or more transforms to the data binding. The binding editor window 680 then displays a transform editor panel in the binding editor window 680 for providing additional inputs for setting the transforms. In this illustrative example, the transform editor panel is a pop-up window that provides one or more transform types that may be selected. The transform types may correspond to one or more different functions or scripts that may calculate transformed data values from the data values in the source data model. In this example, transform types include a mapping function, a format function, a script editor, and an expression editor.

Figure 7F:
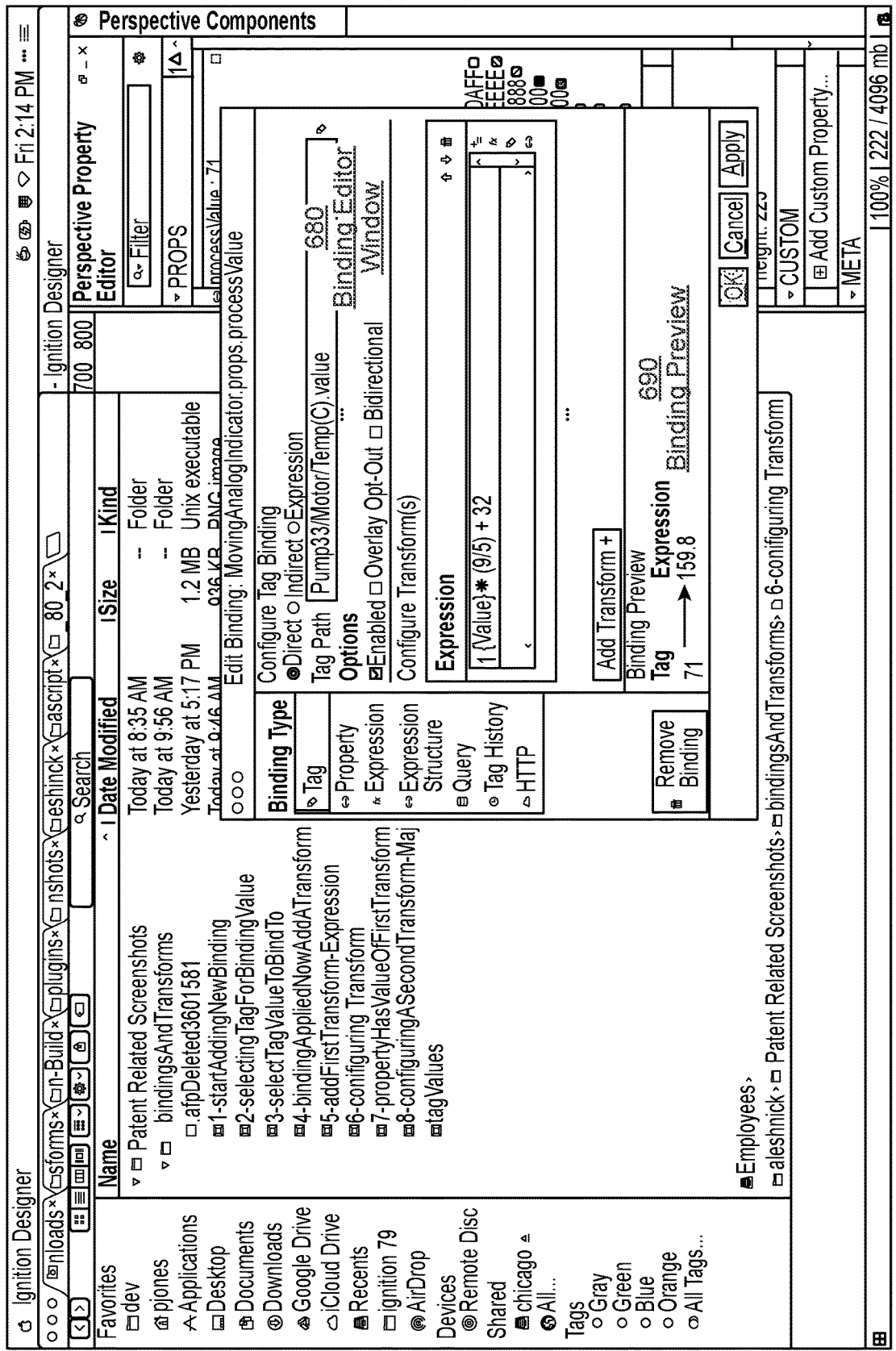

FIG. 7F is a continuation example of FIG. 7E, wherein the transform editor panel is displayed in the binding editor window 680. Once a transform type is selected in the transform editor panel, the transform editor panel displays additional inputs for defining the transform. In this illustrative example, the transform type selected is an expression script. In this illustration, the transform editor panel responds with displaying an expression script editor that can define the expression script being added as a transform to the data binding. In response to a transform being added to the data binding, the binding preview 690 displays the transformed data value according to the transform. In this example, the binding preview 690 takes the data value from the source of "71" and transforms the data value from "71" to "159.8" according to the added transform.

Figure 7G:
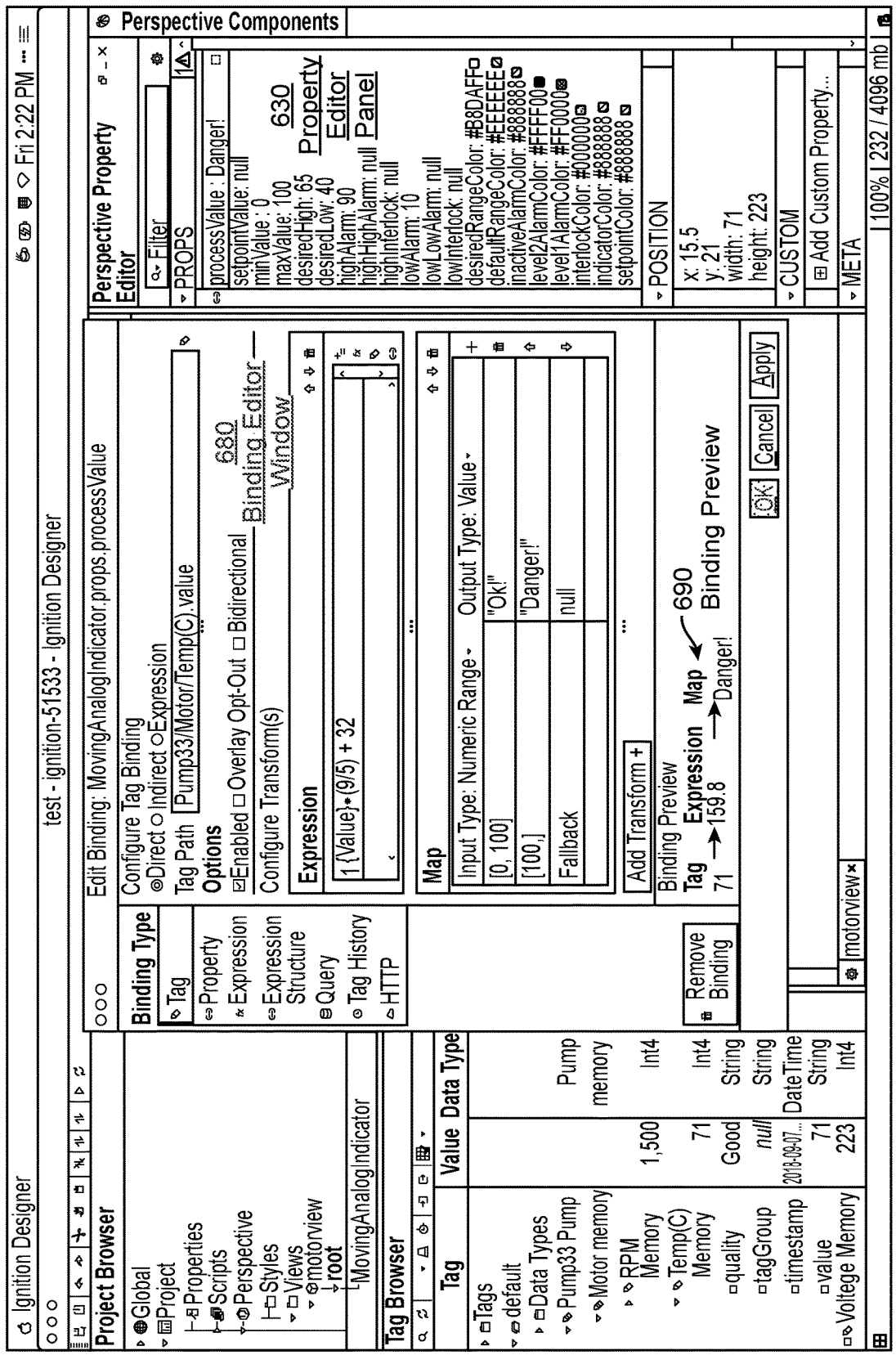

FIG. 7G is a continuation example of FIG. 7F, wherein more than one transform is added to the data binding. In this illustrative example, a second transform is received by the transform option 695. In response, the binding editor window 680 displays the transform editor panel to set the second transform. Once set, the binding preview 690 displays the transformed data value according to the first transform and then according to the second transform. In this example, the second transform is a mapping function that maps scalar data values from 0 up to 100 to the script data value "Ok!", and scalar data values 100 and greater to the script data value "Danger!". As the resultant data value after the first transform is the scalar value 159.8, the second transform maps 159.8 to the script data value "Danger!". Corresponding to the added transforms, the property editor panel 630 displays an updated component data model to reflect the resulting data value after the first and the second transform such that component property "processValue" now is assigned the data value of "Danger!".

FIG. 8 is a flowchart illustrating a process 800 of editing a component data model with a design GUI 600, in accordance with one or more embodiments. The client interfacing module 290 generates the design GUI 600 with the component data model displayed and provides options for a designer to provide inputs to the design GUI 600 for editing the component data model, and is one embodiment for so doing. The client interfacing module 290 provides the design GUI 600 to one or more design clients 115 through an established gateway session.

A first optional step, the design GUI 600 displays 805 a component in a live web browser of a component display portion of the design GUI 600. The component display portion of the design GUI 600 is an embodiment of the component display panel 620. The component display portion comprises the live web browser which displays the component. The display of the component is based on a set of component properties associated with the component that dictate an appearance of the component in the component display portion of the design GUI 600. The component may provide information (e.g., graphically) regarding one or more machines used in an industrial process, e.g., the component is a visual representation of an oven with features that present the oven temperature, pressure, and humidity.

Within the optional step 805, the design GUI 600 may also receive an addition input corresponding to addition of the component into the component display portion. In response to the addition input, the design GUI 600 may display a component template library 670 displaying a plurality of component templates 675 which correspond to components that may be placed into the web browser of the component display portion. The design GUI 600 may receive an input selecting one of the component templates. Then the design GUI 600 may display the component in the live web browser associated with the selected component template.

Next, the design GUI 600 receives 810, at the component display portion, a selection input of selecting the component, facilitated by client interfacing module 290, which is one means for so doing. In response, the component display portion may visually distinguish the selected component within the component display portion.

Then the design GUI 600, in response to receiving the selection input, displays 820 a component data model in a property editor portion of the design GUI 600. The property editor portion is an embodiment of the property editor panel 630. The property editor portion may retrieve a component data model stored in the component property store 220 for the selected component. The component data model has one or more component properties structured in a component hierarchy. When displaying the component data model, the property editor portion may similarly display the component properties in a manner according to the structure of the component hierarchy. The property editor portion is configured to receive one or more edit inputs for editing the component data model.

Next, the design GUI 600, receives 830, at the property editor portion, an edit input of editing the component data model. The edit input received may correspond to modifying a component property or establishing a data binding to the component property. In some examples, modifying a component property includes naming or renaming the component property, adding or removing a component property, and moving the component property to a different node in the component data model. Embodiments where the edit input corresponds to establishing a data binding will be discussed further in FIG. 9.

In response to receiving the edit input, the design GUI 600 updates 840 the component data model displayed in the property editor portion according to the edit input. In examples of modifying the component property, the update of the component data model may reflect the modification to the component property. For example, if the edit input changed the name of the component property, the property editor portion updates to display the new name of the component property.

An optional step, the design GUI 600 updates 850 the component in the web browser of the component display portion based on the edit input. In some embodiments, the edit input changes a component property that results in a change in one or more features of the component. Due to the changes to the component property, the design GUI 600 updates the component and its features to reflect the changed component property.

FIG. 9 is a flowchart illustrating a process 900 of establishing a data binding for a component property with a design GUI 600, in accordance with one or more embodiments. The client interfacing module 290 generates the design GUI 600 adding data bindings and transforms to the bindings, and is one means for so doing. The client interfacing module 290 provides the design GUI 600 to one or more design clients 115 through an established gateway session, and is one means for so doing. In one embodiment, the process of FIG. 9 occurs in conjunction with step 830 of the process of FIG. 8.

First, the design GUI 600, receives 910 an edit input corresponding to establishing a data binding between a subtree of a component data model to a source data model. The design GUI 600 may display a binding option 635, e.g., in a property editor portion of the design GUI 600.

Next the design GUI 600, in response to receiving the edit input, displays 920 a binding editor portion of the design GUI 600 that displays a set of source data models including at least a first source data model. The binding editor portion of the design GUI 600 may be an embodiment of the binding editor window 680. In some embodiments, the binding editor portion may display a plurality of source options that each correspond to data from a data source. In response to receiving an input of one of the source options, the binding editor portion may display one or more source data models including first source data model from the data source corresponding to the selected source option. The first source data model comprises a set of data values that are structured in a first source hierarchy.

The design GUI 600 then receives 930, at the binding editor window 680, a binding input of binding the subtree of the component data model to the first source data model. The binding input may be a selection by a designer via the design GUI 600 of the first source data model from the displayed source data models by the binding editor portion. When the binding input is received, the design GUI 600 may relay the binding input to the design module 280 or the binding module 260 for establishing the data binding between the subtree of the component data model and the first source data model. In some embodiments, the designer may provide an input to close the binding editor portion once the data binding is established.

As an optional step, the design GUI 600 receives 940, at the binding editor window 680, an input for adding one or more transforms to the data binding (established in the binding input received at step 930). The binding editor window 680 receives the input that may describe the transforms to be added to the data binding. In some embodiments, the binding editor portion displays a transform editor portion—an embodiment of the transform editor panel described in FIG. 6 under the binding editor window 680. The transform editor portion receives additional inputs to set the transforms to be added to the data binding. Once the set transform is received, the binding editor portion may provide the design module 280 or the binding module 260 with the transforms to the data binding. The transforms to the data binding transform data values from the first source data model and assigns the transformed data values to the subtree of the component data model.

As an optional step, the design GUI 600 displays 950, at the binding editor window 680, a preview of the transformed set of data values. The binding editor window 680 may display a binding preview 690 within the binding editor window 680 of the design GUI 600 for displaying the transformed data values. With one or more transforms added to a data binding, the binding preview 690 may display transformed data values after each subsequent transform.

The design GUI 600 then updates 960 the component data model in the property editor portion according to the binding input. Update step 960 is an embodiment of update step 840 of updating the component data model according to the edit input, in one embodiment. Once the data binding between the subtree of the component data model and the first source data model is established, the design GUI 600 updates the component data model in the property editor portion such that the subtree of the component data model has data values from the first source data model structured in the first source hierarchy. In embodiments with the optional steps 940 and 950, the design GUI 600 updates the component data model in the property editor portion such that the subtree of the component data model has transformed data values (according to the added transforms) structured in the first source hierarchy.

Next, the design GUI 600 updates 970 the component in the in the web browser of the component display portion based on the binding input. Update step 970 is an embodiment of the update step 850 of updating the component in the web browser in the component display portion according to the edit input. When the component data model updates based on the data binding and any transform added to the data binding, the component also updates to reflect the changes to the component properties in the component data model due to the data binding and any transforms to the data binding.

Graphical User Interface for Accessing Projects

Figure 10:
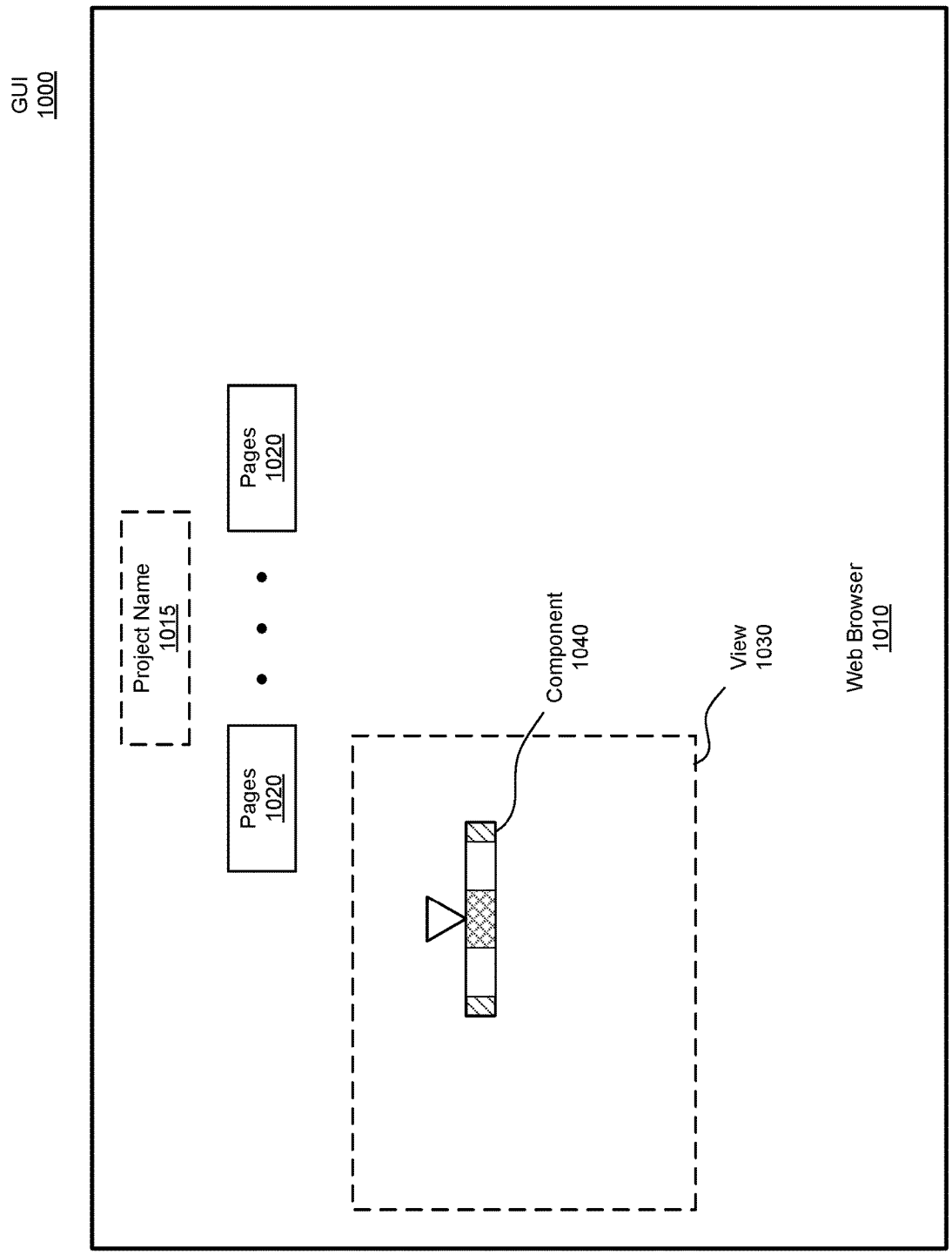
FIG. 10 is an illustration of a graphical user interface (GUI) for a client, in accordance with one or more embodiments.

FIG. 10 is an illustration of a graphical user interface (GUI) 1000 for client 110, in accordance with one or more embodiments. The client interfacing module 290 generates the GUI 1000 and provides the GUI 1000 to one or more clients 110 for accessing the project. The GUI 1000 includes a live web browser 1010 containing a project name 1015, one or more pages 1020, a view 1030, and a component in the view 1040. In addition, the GUI 1000 may have one or more options that are graphical elements displayed and configured to receive one or more inputs. In other embodiments, the GUI 1000 may have additional or fewer graphical elements than those listed herein. Additionally, the functions described for the listed graphical elements may be variably distributed amongst the other graphical elements. In other embodiments, the GUI 1000 is provided through an API executed on a client 110 that establishes a gateway session with the gateway system 130.

The web browser 1010 displays a view 1030 on a page with one or more components 1040 in the view 1030. In other embodiments, the page may have numerous other views, and each view may have numerous other components. The web browser 1010 is similar to that of the web browser 625 in that components are displayed in the web browser 1010. The web browser 1010 displays the pages 1020 as navigational inputs that allow a user of the GUI 1000 to navigate between pages of the project. The GUI 1010 retrieves component properties from the component property store 220 and displays the component 1040 according to the component properties. In some embodiments, the client 110 has access to provide inputs to one or more component properties in the component 1040. When an input is provided, the GUI 1000 updates display of the component in the web browser 1010. Correspondingly, the inputs to the component properties are provided to the component property store 220. In embodiments where the component 1040 has a bi-directional data binding, the input to the component properties may affect a change of data values at a data source, e.g., inputting a value representing temperature on the component will set the temperature of an oven in an industrial process.

Figure 11A:
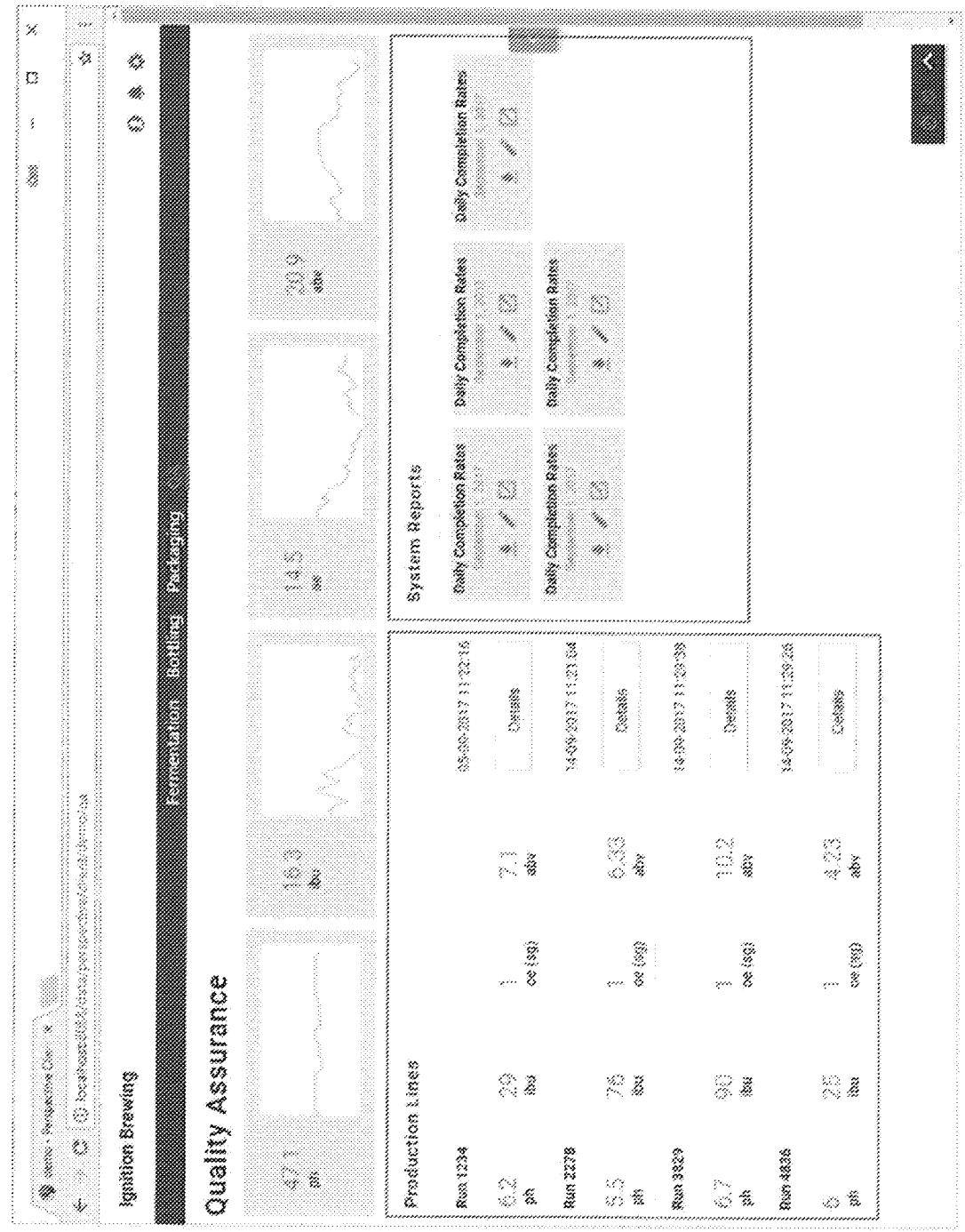
FIGS. 11A and 11B are examples of the GUI provided to one or more clients, in accordance with some embodiments.
Figure 11B:
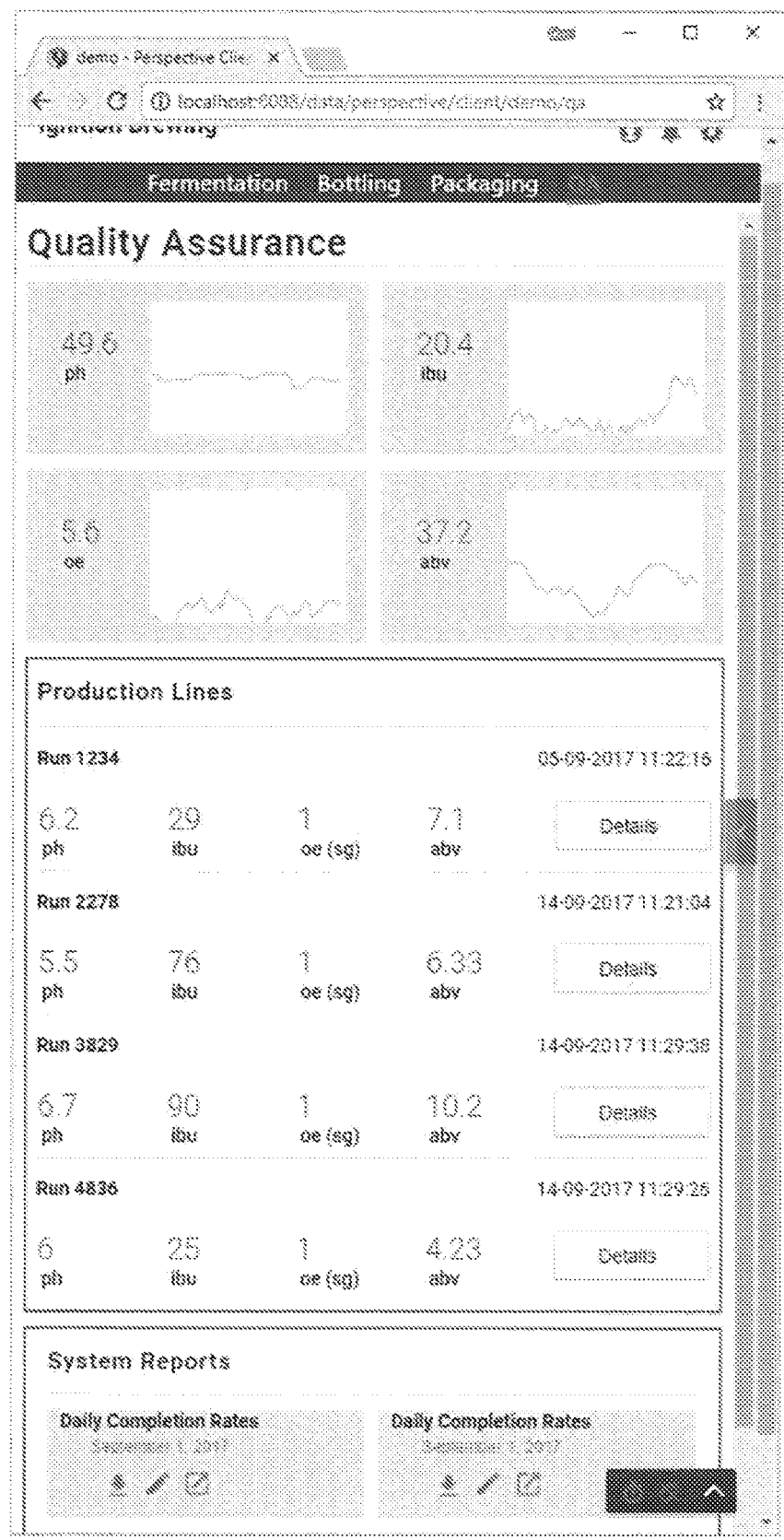

FIGS. 11A and 11B are examples of the GUI 1000 provided to one or more clients 110, in accordance with some embodiments.

FIG. 11A is an example of the GUI 1000 formatted on a wide format web browser, in accordance with an embodiment. In this illustrative example, the GUI 1000 has the project name 1015, the pages 1020 for navigation, one or more views 1030, and one or more components 1040 displayed in a web browser 1010. The web browser 1010 is in a wide format presenting one or more views side by side. The project name 1015 "Ignition Brewing" designates which project is accessed. The pages 1020 "Fermentation," "Bottling," "Packaging," and "QA" present navigational inputs for switching to various pages in the project. Corresponding to the current page "QA," one or more views are presenting graphical information relating to the industrial process associated with this project. In a view placed near the top below the pages 1020, graph components display various data values as a function of time. Each graph component is displayed according to component properties and corresponding data bindings and/or transforms to the data bindings.

FIG. 11B is another example of the GUI 1000 formatted on a narrow format web browser, in accordance with an embodiment. In this illustrative example, the same project of FIG. 11A is being accessed by a client 110 that has a web browser 1010 with a narrow format. The same project name 1015 and pages 1020 still provide navigation throughout various pages in the project. Due to the narrow format of the web browser 1010, the GUI 1000 displays the views in the page "QA" in a stacked layout.

CONCLUSION

Figure 12:
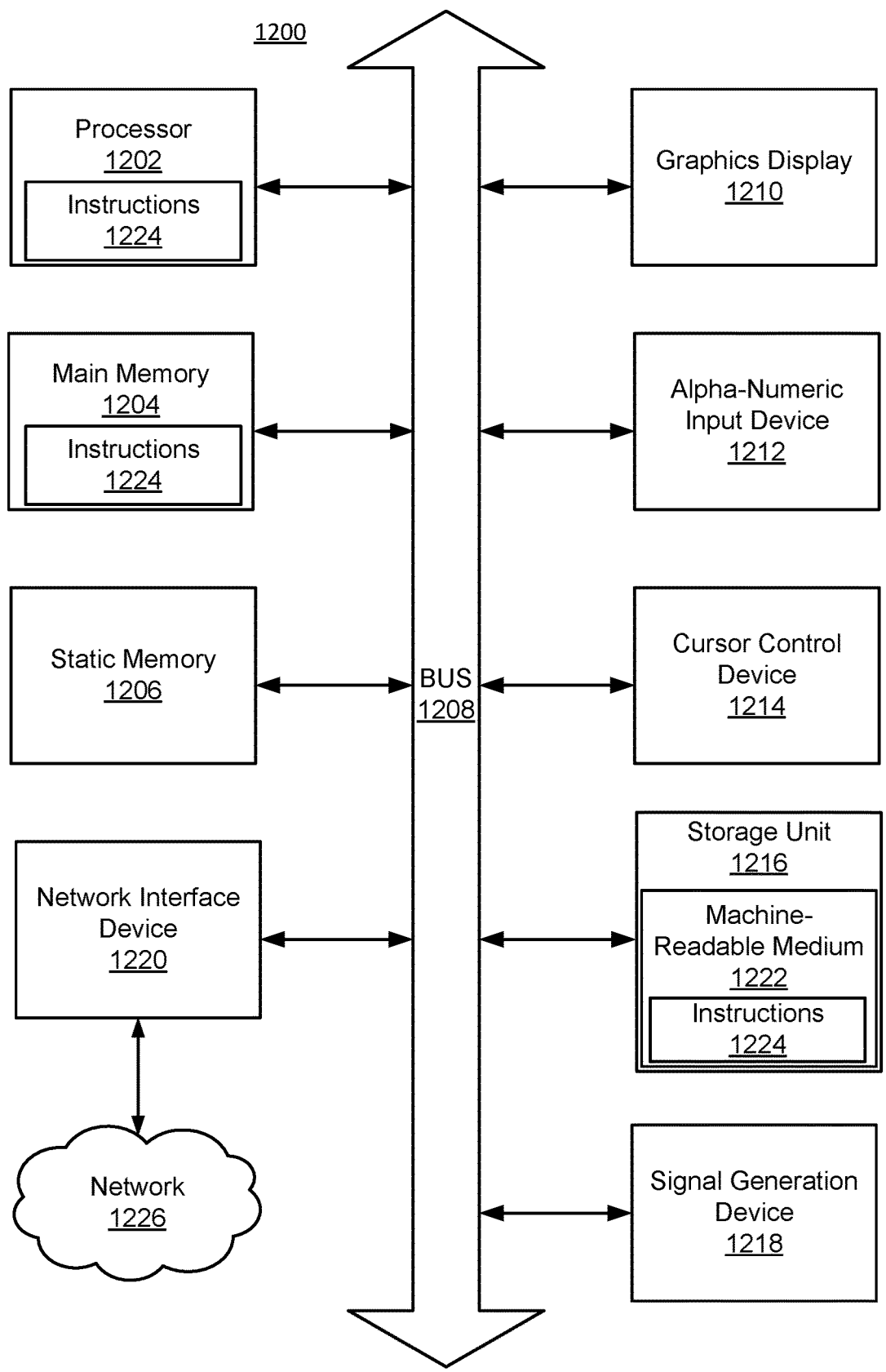
FIG. 12 is a block diagram illustrating components of an example machine able to read instructions from a machine-readable medium and execute the instructions in one or more processors, in accordance with an embodiment.

FIG. 12 is a block diagram illustrating components of an example machine able to read instructions from a machine-readable medium and execute them in one or more processors (or controllers). Specifically, FIG. 12 shows a diagrammatic representation of gateway system 130 in the example form of a computer system 1200. The computer system 1200 can be used to execute instructions 1224 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes one or more processing units (generally processor 1202). The processor 1202 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1200 also includes a main memory 1204. The computer system may include a storage unit 1216. The processor 1202, memory 1204, and the storage unit 1216 communicate via a bus 1208.

In addition, the computer system 1200 can include a static memory 1206, a graphics display 1210 (e.g., to drive a plasma display panel (PDP), a liquid crystal display (LCD), or a projector). The computer system 1200 may also include alphanumeric input device 1212 (e.g., a keyboard), a cursor control device 1214 (e.g., a mouse, a trackball, a joystick, a motion sensor, or other pointing instrument), a signal generation device 1218 (e.g., a speaker), and a network interface device 1220, which also are configured to communicate via the bus 1208. In some embodiments, the computer system 1200 may include cell phone or smartphone hardware, such as a camera, motion sensor, accelerometer, scanner (or QR code reader), global positioning system (GPS) functionalities and geolocation abilities, near field communication, etc.

The storage unit 1216 includes a machine-readable medium 1222 on which is stored instructions 1224 (e.g., software) embodying any one or more of the methodologies or functions described herein. For example, the instructions 1224 may include instructions for implementing the functionalities of the binding module 260, the design module 280 and/or the client interfacing module 290. The instructions 1224 may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store the instructions 1224. The term "machine-readable medium" shall also be taken to include any medium that is capable of storing instructions 1224 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    establishing a data binding between a source data model and a property tree stored at a central server system, wherein the property tree comprises a data structure that includes a set of nodes, each node corresponding to a property of a component of the source data model; and
    in response to detecting a change in the configuration of a first component of the source data model, updating nodes of a subtree of the property tree corresponding to the first component and identified using the data binding to match an updated hierarchical structure of the source data model.

2. The computer-implemented method of claim 1, further comprising:
    determining that a data value in the source data model has changed; and
    updating an associated value at an associated node in the property tree.

3. The computer-implemented method of claim 2, wherein a data value comprises a tuple including a value, a quality value, and a timestamp value.

4. The computer-implemented method of claim 1, further comprising:
    determining that a property value at a node in the property tree has changed; and
    updating an associated data value in the source data model.

5. The computer-implemented method of claim 4, wherein a property value associated with a node of the property tree comprises a tuple including a value, a quality value, and a timestamp value.

6. The computer-implemented method of claim 4, wherein updating the associated data value in the source data model comprises propagating the changed data value to a data source associated with the source data model.

7. The computer-implemented method of claim 6, wherein a data source associated with the source data model is one of: a programmable logic controller, an Application Programming Interface, a function, an expression, a database, and a second property tree.

8. The computer-implemented method of claim 1, wherein establishing the data binding between the source data model and the property tree comprises storing information about a bi-directional association in which values in the source data model and the property tree update in relation to each other.

9. The computer-implemented method of claim 1, further comprising:
    detecting a change in a configuration of the property tree;
    in response to detecting the change in the configuration of the property tree:
        identifying the source data model associated with the property tree using the data binding; and
        updating the source data model based on the detected change in the configuration of the property tree.

10. The computer-implemented method of claim 1, wherein the property tree includes properties associated with a user interface component.

11. A non-transitory computer-readable storage medium storing computer program instructions executable by one or more processors of a system to perform steps comprising:
    establishing a data binding between a source data model and a property tree stored at a central server system, wherein the property tree comprises a data structure that includes a set of nodes, each node corresponding to a property of a component of the source data model; and
    in response to detecting a change in the configuration of a first component of the source data model, updating nodes of a subtree of the property tree corresponding to the first component and identified using the data binding to match an updated hierarchical structure of the source data model.

12. The non-transitory computer-readable storage medium of claim 11, the steps further comprising:
    determining that a data value in the source data model has changed; and
    updating an associated value at an associated node in the property tree.

13. The non-transitory computer-readable storage medium of claim 12, wherein a data value comprises a tuple including a value, a quality value, and a timestamp value.

14. The non-transitory computer-readable storage medium of claim 11, the steps further comprising:
    determining that a property value at a node in the property tree has changed; and
    updating an associated data value in the source data model.

15. The non-transitory computer-readable storage medium of claim 14, wherein a property value associated with a node of the property tree comprises a tuple including a value, a quality value, and a timestamp value.

16. The non-transitory computer-readable storage medium of claim 14, wherein updating the associated data value in the source data model comprises propagating the changed data value to a data source associated with the source data model.

17. The non-transitory computer-readable storage medium of claim 16, wherein a data source associated with the source data model is one of: a programmable logic controller, an Application Programming Interface, a function, an expression, a database, and a second property tree.

18. The non-transitory computer-readable storage medium of claim 11, wherein establishing the data binding between the source data model and the property tree comprises storing information about a bi-directional association in which values in the source data model and the property tree update in relation to each other.

19. The non-transitory computer-readable storage medium of claim 11, further comprising:
    detecting a change in a configuration of the property tree;
    in response to detecting the change in the configuration of the property tree:
        identifying the source data model associated with the property tree using the data binding; and
        updating the source data model based on the detected change in the configuration of the property tree.

20. The non-transitory computer-readable storage medium of claim 11, wherein the property tree includes properties associated with a user interface component.

* * * * *